United States Patent
Okazaki et al.

(10) Patent No.: US 6,545,784 B2
(45) Date of Patent: Apr. 8, 2003

(54) OPTICAL CROSS CONNECT UNIT, OPTICAL ADD-DROP MULTIPLEXER, LIGHT SOURCE UNIT, AND ADDING UNIT

(75) Inventors: Kazue Okazaki, Kawasaki (JP); Hiroshi Onaka, Kawasaki (JP); Hideyuki Miyata, Kawasaki (JP); Yutaka Kai, Kawasaki (JP); Terumi Chikama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/905,066

(22) Filed: Jul. 16, 2001

(65) Prior Publication Data
US 2002/0030869 A1 Mar. 14, 2002

Related U.S. Application Data

(62) Division of application No. 09/050,105, filed on Mar. 30, 1998, now Pat. No. 6,285,479.

(30) Foreign Application Priority Data

Oct. 20, 1997 (JP) ............................................. 9-287489

(51) Int. Cl.[7] ................................................. H04J 14/02
(52) U.S. Cl. .......................................... 359/128; 385/17
(58) Field of Search ................................ 359/128, 117, 359/139, 133; 385/17

(56) References Cited

U.S. PATENT DOCUMENTS

| | | | |
|---|---|---|---|
| 4,821,255 A | * 4/1989 | Kobrinski | 359/128 |
| 5,202,780 A | 4/1993 | Fussganger | 359/125 |
| 5,305,134 A | 4/1994 | Tsushima et al. | 359/192 |
| 5,446,572 A | 8/1995 | Husbands et al. | 359/133 |
| 5,457,556 A | * 10/1995 | Shiragaki | 359/117 |
| 5,555,118 A | 9/1996 | Huber | 359/125 |
| 5,570,440 A | 10/1996 | Mizrahi | 385/37 |
| 5,589,970 A | 12/1996 | Lyu et al. | 359/133 |
| 5,717,795 A | 2/1998 | Sharma et al. | 385/24 |
| 5,724,167 A | * 3/1998 | Sabella | 359/120 |
| 5,790,288 A | 8/1998 | Jager et al. | 359/123 |
| 5,920,414 A | 7/1999 | Miyachi et al. | 359/133 |
| 6,317,529 B1 | * 11/2001 | Kashima | 359/128 |
| 6,362,905 B1 | * 3/2002 | Fukashiro et al. | 359/110 |

* cited by examiner

Primary Examiner—Kinfe-Michael Negash
(74) Attorney, Agent, or Firm—Staas & Halsey LLP

(57) ABSTRACT

M wavelength separating sections receive multiplexed optical signals each having N kinds of wavelengths different. Each of the multiplexed optical signals are separated into N optical signals. M relays conduct optical reproduction and relay to convert each of the N optical signals into electric signals and then produce optical signals modulated with desired optical wavelengths. A refill section mutually refills M sets of the reproduced and relayed optical signals. A focusing section focuses the M sets of optical signals refilled in the refill section. A light source supplies input lights having desired wavelengths, which lights are modulated in the relays. The light source includes N light sources outputting N kinds of optical wavelengths. A multiplexer/brancher multiplexes the lights from the N light sources to produce a multiplexed light and branches the multiplexed light into M×N distributed lights. M wavelength filters distribuitively receive N distributed lights of the M×N distributed lights.

7 Claims, 19 Drawing Sheets

W : WORK SYSTEM
P : PROTECTION SYSTEM
OPT. ADM : OPTICAL ADM SYSTEM
SW : OPTICAL SWITCH
ADD : INSERTING PORT
DROP : BRANCHING PORT

OPTICAL CROSS CONNECT UNIT, OPTICAL ADD-DROP MULTIPLEXER, LIGHT SOURCE UNIT, AND ADDING UNIT

This application is a divisional application of application Ser. No. 09/050,105, filed Mar. 30, 1998, now U.S. Pat. No. 6,285,479 now allowed.

BACKGROUND OF THE INVENTION

1) Field of the Invention

The present invention relates to an optical cross connect unit, optical add-drop multiplexer, light source unit and adding unit suitably employed in the field of wavelength division multiplex transmission where a plurality of different wavelengths are multiplexed for transmission.

2) Description of the Related Art

A wavelength division multiplexing (which will be referred hereinafter to as a WDM) method has been known as a transmission technique which is capable of increasing the transmission capacity and of constructing a network having flexibility in adding and dropping of signals.

This WDM method relates to a technique for multiplexing and transmitting a plurality of different optical wavelength signals, and if multiplexing signals of the same transmission speed, permits the transmission of more information by a quantity corresponding to the number of wavelengths multiplexed as compared with a prior method in which light having one kind of wavelength is modulated and transmitted through one optical fiber. Further, even in the case of low-speed signals, the multiplexing based upon the WDM method can provide a transmission capacity similar to that in a method of sending signals with single wave at a high speed.

On the other hand, since the WDM method is made to make use of the band property of an optical fiber for the purpose of transmitting multiplexed signals (multiple signals), there is a need to set a large wavelength interval whereby the signals undergoes not influence from the adjacent wavelength signals.

Furthermore, on the basis of the above-mentioned WDM transmission system, there has been proposed an optical network in which a repeater, so-called node, is placed in a transmission path on the network. This node has an optical cross connect function to separate wavelength-multiplexed signals in accordance with every wavelength and to distribute the signals to desired transmission paths after conducting wavelength conversion when necessary, and further has an optical ADM function to freely perform the add/drop of desired optical wavelength signals including necessary information.

FIG. 14 is an illustration of a related art. As shown in FIG. 14, the optical cross connect unit 100' receives wavelength multiplexed signals each having a plurality of different wavelengths λ1 to λ8 coming through 16 optical fibers 0'-1 to 0'-16, and performs the conversion of transmission light at every wavelength signal included in each of the wavelength multiplexed signals and the replacement of optical signals such as the interchange among the corresponding transmitting optical fibers 0'-1 to 0'-16.

FIG. 15 is a block diagram showing the related art. As shown in FIG. 15, the optical cross connect unit 100' is made up of amplifiers 0c'-1 to 0c'-16 for amplifying powers of wavelength multiplexed signals, demultiplexers (branching filters) 10a'-1 to 10a'-16 for conducting demultplexing in accordance with every wavelength, ORs 21a' for conducting the conversion of a given wavelength signal to an electric signal to transmit the conversion result, OSs 21b' for newly producing transmission light, 8×16 DC switches 30a'-1 to 30a'-16 for taking the charge of control of destinations for 8 optical signals, 16×1 couplers 40a'-1 to 40a'-16 for multiplexing the optical signals from the 8×16 DC switches 30a'-1 to 30a'-16, and amplifiers 0d'-1 to 0d'-16 for amplifying a power of combined light.

Furthermore, FIGS. 16 and 17 are block diagrams each showing the related art. As shown in FIG. 16, each of the ORs 21a' is composed of a photodiode (which will be referred hereinafter to as a PD) 21a'-1, while each of the OSs 21b' is made up of 8 LD light sources 21b'-1, an optical switch 21b'-2 for selecting one of lights (a plurality of light) from the 8 LD light sources 21b'-1, and a modulator 21b'-3 for performing the modulation of light with a given wavelength on the basis of the information converted into an electric signal (photoelectric current) in the PD 21a'-1.

On the other hand, the OS 21b' shown in FIG. 17 comprises a wavelength variable LD 21b'-4 for emitting 8 kinds of light having different wavelengths from each other, and a modulator 21b'-3 for conducting modulation of light with a given wavelength from the wavelength variable LD 21b'-4 on the basis of the information undergoing the electric conversion in the PD 21a'-1.

With this arrangement, the prior optical cross connect unit 100' is made to conduct the cross connect processing for each of the signals included in each of the wavelength multiplexed signals.

In such a mesh-like network, the optical cross connect unit receives N-wave multiplexed signals through M fibers, and separates them in accordance with every wavelength, and conducts a wavelength conversion if necessary, and further performs the optical-wavelength multiplexing for desired signals and transmits them through a desired fiber.

More specifically, an optical signal based upon each of lights wavelength-separated in the demultiplexers 10a'-1 to 10a'-16 is converted into an electric signal which in turn, is used for modulating light with a wavelength from a new light source, so that desired signals are forwarded toward desired fibers 0'-1 to 0'-16 in a manner that the switching among the paths is made through the switches 30a'-1 to 30a'-16.

In addition to the aforesaid WDM method of conducting the transmission from point to point, there has been proposed a network based upon a WDM method having an ADM (Add-Drop Multiplexer) function in which a specific-wavelength signal light of the multiplexed signal lights is selectively allowed to pass through a repeating point, so-called node, placed in the middle of the transmission path while the signals with the other wavelengths are received by that node or a different signal light is added therein at this node to be transmitted toward a different node.

FIG. 18 is an illustration of a WDM based network 300' equipped with an ADM function. Further, FIG. 19 is an illustration of a network 300" provided with an ADM function. In the illustrations, an ADM unit supplies, in relation to the wavelengths of 5 dropped lights, lights with wavelengths equal to the wavelengths of the 5 (or 4) dropped lights. Incidentally, in the case of actually conducting the branching of P waves to N waves (N: natural number) which is the maximum number in use, the number of wavelengths to be inserted does not always coincide with the P waves.

As shown in FIG. 20, the optical ADM unit 400'-1 includes switches 223' for selecting one light from 8 LD light sources, amplifiers 223'-1 for amplifying the powers of the lights from the switches 223', respectively, modulators 227' for conducting the modulation processing for lights from the switches 223', respectively, and a multiplexer 228' for wavelength-multiplexing optical signals from the modulators 227'.

With the above-mentioned arrangement, the optical ADM unit 400'-1 can freely achieve the drop/add of an optical signal.

On the other hand, FIG. 21 illustrates an optical ADM unit 400'-2 equipped with a wavelength variable LD 221' which outputs 8 kinds of lights having wavelengths different from each other without having 8×5 LD light sources unlike the FIG. 20 optical ADM unit 400'-1. Even the optical ADM unit 400'-2 shown in FIG. 21 is also capable of freely conducting the drop/add in a state where the signal is in an optical condition as well as the optical ADM unit 400'-1.

There is a problem which arises with the related optical cross connect unit 100', however, in that the equipment of 16×8×8 LD light sources becomes necessary and the management of the light sources themselves becomes troublesome. In addition, difficulty is encountered to dynamically switch the wavelengths according to the circumstances and the transmission is made with predetermined wavelengths, with the result that its system lacks flexibility.

Furthermore, similarly, the optical ADM 400'-1 is required to be equipped with 8×5 LD light sources, with the result that the management of the light sources themselves becomes troublesome.

Although a reductancy arrangement such as the preparation of spare light sources for provision against the breakdown of light sources should be taken into consideration for the real system, the preparation of spare light sources for all the light sources in the wavelength multiplexing and transmitting section heavily sacrifices cost, and if spare light sources for all the light sources are prepared even in the case of the equipment of a large number of wavelength multiplexing systems, the cost of the light source section extremely increases.

Still further, although the arrangement can also be made with wavelength variable light sources, this case can create a problem in the sweep time taken until setting to a desired wavelength and the influence on the other signals in the meantime.

SUMMARY OF THE INVENTION

The present invention has been developed with a view to eliminating these problems, and it is therefore an object of this invention to provide an optical cross connect unit, optical add-drop multiplexer, light source unit and adding unit which are capable of, when many light sources are necessary for conducting the modulation processing through a modulator or the like, employing given optical wavelengths from a small number of light sources for much modulation processing.

For this purpose, in accordance with the present invention, there is provided an optical cross connect unit comprising M wavelength separating sections for receiving multiplexed optical signals each having N kinds of wavelengths different from each other through M optical fibers, respectively, and for wavelength-separating each of the multiplexed optical signals into N optical signals, M optical reproduction relay (repeating) sections each for conducting an optical reproduction and relay in a manner of making a conversion of each of the N optical signals, wavelength-separated in each of the wavelength separating sections, into an electric signal and then modulating it with a desired optical wavelength, a refill section for mutually refilling M sets of optical signals optically reproduced and relayed in the optical reproduction relay sections, a focusing section for focusing the M sets of optical signals refilled in the refill section, and a light source unit for supplying input lights having desired wavelengths to be modulated in the M optical reproduction relay sections.

In this optical cross connect unit, the light source unit includes N light sources for outputting lights having the aforesaid N kinds of optical wavelengths, a multiplexing and branching section for multiplexing the lights from the N light sources to produce a multiplexed light having N kinds of optical wavelength components and further for branching the multiplexed light into M×N lights to output them as multiplexed and distributed lights, M wavelength filter sections for distributively receiving N multiplexed and distributed lights of the M×N multiplexed and distributed lights branched in the multiplexing and branching section to output N lights due to the passage of only arbitrary wavelengths of the aforesaid N kinds of optical wavelengths, and a wavelength setting control section for setting optical wavelengths, which pass through the wavelength filter sections, so that they differ from each other, with the N lights from each of the M wavelength filter sections being supplied as the aforesaid input lights.

Accordingly, the optical cross connect unit according to this invention can generate a large number of wavelength multiplexed signals from one set of light sources, with the result that the control/management of the light source wavelengths are expectable to be facilitated and the wavelength selection can arbitrarily be made through the wavelength filter sections, which enhances the extension of the optical cross connect unit itself and increases the number of lights to be distributed at a low cost.

Furthermore, an optical add-drop multiplexer according to this invention is composed of a dropping section for dropping an optical signal with arbitrary P kinds of wavelengths of N kinds of different wavelengths constituting a multiplexed optical signal having the N kinds of wavelengths to be transmitted through a transmission optical fiber, and an adding section for adding a transmission optical signal having P' kinds of wavelengths corresponding to the wavelengths demultiplexed in the demultiplexing section into the transmission optical fiber. The adding section is composed of N light sources for outputting lights with N kinds of optical wavelengths, a multiplexing and branching section for multiplexing the lights from the N light sources to produce a multiplexed light having N kinds of optical wavelength components and further for branching the multiplexed light into M×N lights to output them as multiplexed and distributed lights, M wavelength filter sections for distributively receiving N multiplexed and distributed lights of the M×N multiplexed and distributed lights branched in the multiplexing and branching section to output N lights due to the passage of only arbitrary wavelengths of the aforesaid N kinds of optical wavelengths, a wavelength setting control section for setting optical wavelengths, which pass through each of the wavelength filter sections, so that they differ from each other, and a modulating section for receiving N lights from any one of the M wavelength filter sections as input lights to perform data modulation processing for the input lights, with the N lights from each of the wavelength filter sections of the inserting section, other than the aforesaid one wavelength filter section, being used as input lights to be taken when conducting the data modulation processing in an adding section of another optical add-drop multiplexer coupled through the aforesaid transmission optical fiber.

Thus, since the optical add-drop multiplexer according to this invention is composed of a dropping section for dropping an optical signal with arbitrary P kinds of wavelengths of N kinds of different wavelengths constituting a multiplexed optical signal having the N kinds of wavelengths to be transmitted through a transmission optical fiber, and an adding section for adding a transmission optical signal having P' kinds of wavelengths corresponding to the wavelengths dropped in the dropping section to the transmission optical fiber. The adding section is composed of N light sources for outputting lights with N kinds of optical wavelengths, a multiplexing and branching section for multiplexing the lights from the N light sources to produce a multiplexed light having N kinds of optical wavelength components and further for branching the multiplexed light into M×N lights to output them as multiplexed and distributed lights, M wavelength filter sections for distributively receiving N multiplexed and distributed lights of the M×N multiplexed and distributed lights branched in the multiplexing and branching section to output N lights due to the passage of only arbitrary wavelengths of the N kinds of optical wavelengths, a wavelength setting control section for setting optical wavelengths passing through each of the wavelength filter sections so that they differ from each other, and a modulating section for receiving N lights from one set of wavelength filter sections of the M wavelength filter sections as input lights to perform data modulation processing for the input lights while the N lights from each of the wavelength filter sections of the adding section other than the one set of wavelength filter sections are used as input lights to be taken when conducting the data modulation processing in an adding section of another optical add-drop multiplexer coupled through the transmission optical fiber, the wavelength filter sections can arbitrarily select lights with the same wavelengths as those of the dropped lights through the use of a wavelength multiplexed signal distributing light source.

Moreover, a light source unit for supplying input lights having desired wavelengths according to this invention comprises N light sources for outputting lights with N kinds of optical wavelengths, a multiplexing and branching section for multiplexing the lights from the N light sources to produce a multiplexed light having N kinds of optical wavelength components and further for branching the multiplexed signal into at least N lights to output them as multiplexed and distributed lights, N wavelength filters for receiving the N multiplexed and distributed lights branched in the multiplexing and branching section but for allowing the passage of only one optical wavelength of the N kinds of optical wavelengths, and a wavelength setting control section for setting the optical wavelengths to be allowed to pass through the N wavelength filters so that, when arbitrarily combined, they are different from each other.

Accordingly, since a light source unit for supplying input lights having desired wavelengths according to this invention comprises N light sources for outputting lights with N kinds of optical wavelengths, a multiplexing and branching section for multiplexing the lights from the N light sources to produce a multiplexed light having N kinds of optical wavelength components and further for branching the multiplexed signal into at least N lights to output them as multiplexed and distributed lights, N wavelength filters for receiving the N multiplexed and distributed lights branched in the multiplexing and branching section but for allowing the passage of only one optical wavelength of the N kinds of optical wavelengths, and a wavelength setting control section for setting the optical wavelengths to be allowed to pass through the N wavelength filters so that, when arbitrarily combined, they are different from each other, the wavelength filters can select lights with desired wavelengths, so that the light source unit can preferably be used as light source means as compared with a type of electrically switching the wavelengths.

Furthermore, a light source unit according to this invention comprises N light sources for outputting lights having N kinds of optical wavelengths, a multiplexing and branching section for multiplexing the lights from the N light sources to produce a multiplexed light having N kinds of optical wavelength components and further for branching the multiplexed light into M lights to output them as multiplexed and distributed lights, M wavelength filter sections for distributively receiving M multiplexed and distributed lights to output M lights each of which wavelengths correspond to one of the N kinds of optical wavelengths, and a wavelength setting control section for setting optical wavelengths, which pass through the wavelength filter sections.

Accordingly, the light source unit according to this invention can generate a large number of wavelength multiplexed signals from one set of light sources, with the result that the control/management of the light source wavelengths are expectable to be facilitated and the wavelength selection can arbitrarily be made through the wavelength filter sections, which increases the number of lights to be distributed at a low cost.

Still further, an adding unit according to this invention comprises N light sources for outputting lights with N kinds of optical wavelengths, a multiplexing and branching section for multiplexing said lights from the N light sources to produce a multiplexed light having N kinds of optical wavelength components and further for branching the multiplexed light into M lights to output them as multiplexed and distributed lights, M wavelength filter sections for distributively receiving M multiplexed and distributed lights to output M lights each of which wavelengths correspond to one of the N kinds of optical wavelengths, a wavelength setting control section for setting optical wavelengths, which pass through the wavelength filter sections, and a modulating section for receiving M lights from the M wavelength filter sections as input lights to perform data modulation processing for the input lights.

Accordingly, for instance, the light corresponding to the light dropped in an optical add-drop multiplexer can be supplied as add light.

Moreover, a light source unit for supplying input lights according to this invention comprises N light sources for outputting lights with N kinds of optical wavelengths, a multiplexing and branching section for multiplexing the lights from said N light sources to produce a multiplexed light having N kinds of optical wavelength components and further for branching the multiplexed light into M lights to output them as multiplexed and distributed lights, M wavelength filters for receiving the M multiplexed and distributed lights branched in the multiplexing and branching section, and for allowing the passage of only one optical wavelength of the N kinds of optical wavelengths; and a wavelength setting control section for setting the optical wavelengths to be allowed to pass through the N wavelength filters.

Accordingly, the wavelength filters can select lights with desired wavelengths, so that the light source unit can preferably be used as light source means as compared with a type of electrically switching the wavelengths.

BRIEF DESCRIPTION OF THE DRAWINGS

DESCRIPTION OF THE PREFERRED EMBODIMENTS (a) Description of Aspect of the Present Invention FIG. 1 is a block diagram showing an aspect of an optical cross connect unit 100 according to the present invention. In FIG. 1, reference numerals 10-1 to 10-M represent wavelength separating sections, respectively. These M wavelength separating sections 10-1 to 10-M receive multiplexed signals (multiple signals) each having N kinds of wavelengths different from each other through M optical fibers 0-1 to 0-M, respectively, and make wavelength separation of the multiplexed optical signal into N optical signals.

Figure 1:
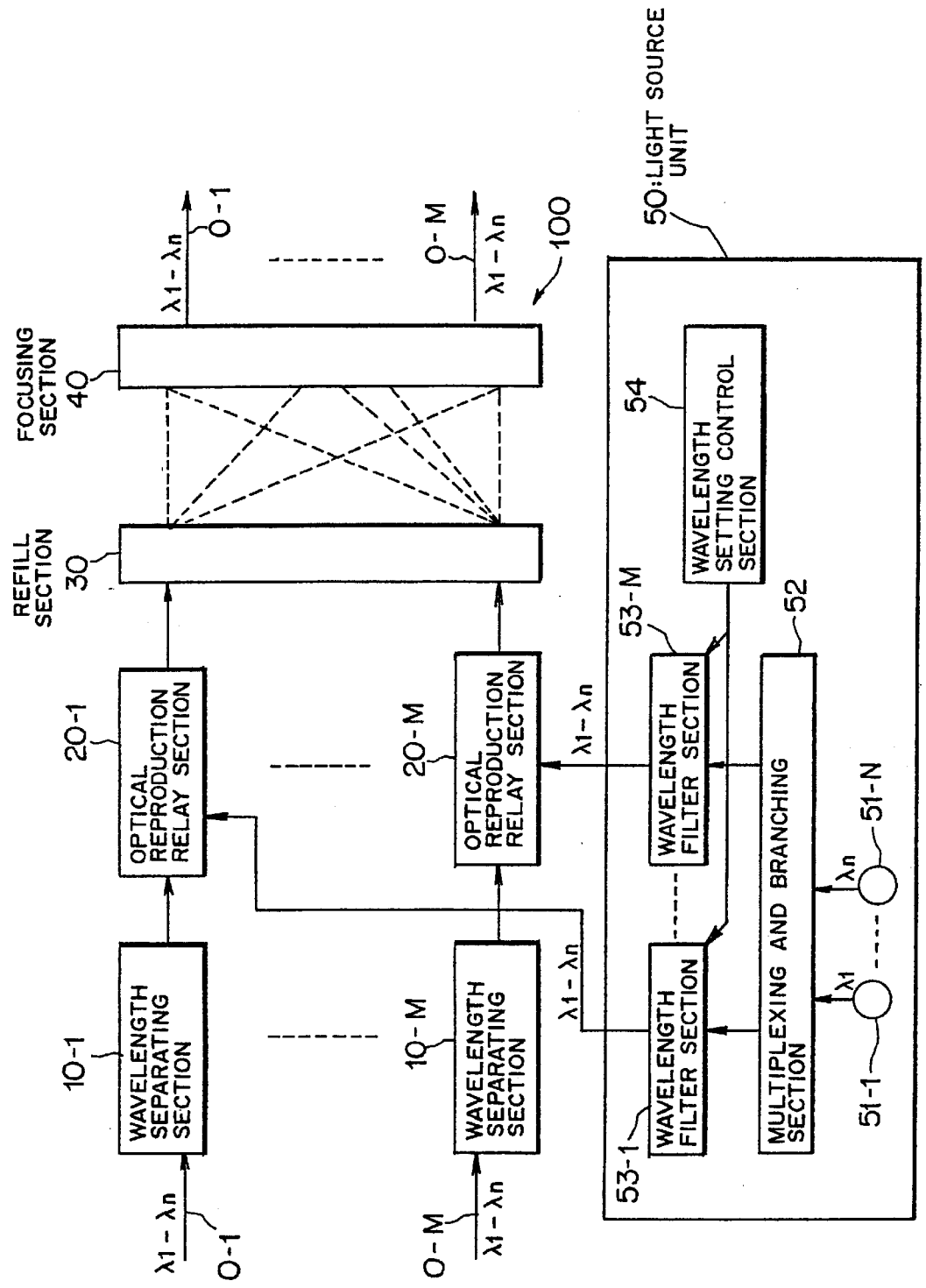
FIG. 1 is a block diagram showing an aspect of an optical cross connect unit according to the present invention.

Furthermore, numerals 20-1 to 20-M designate optical reproduction relay sections, with each of the optical reproduction relay sections 20-1 to 20-M modulates each of N optical signals with a desired optical wavelength after converting into an electric signal, thereby accomplishing the optical reproduction and relay.

Still further, numeral 30 denotes a refill section which is for the purpose of mutually refilling M optical signals optically reproduction-relayed in the respective optical reproduction relay sections 20-1 to 20-M.

Besides, numeral 40 depicts a focusing section which works to focus the M optical signals refilled in the refill section 30.

Moreover, numeral 50 signifies a light source unit which is for supplying input lights with desired wavelengths to be modulated in the M optical reproduction relay sections 20-1 to 20-M.

The light source unit 50 is made up of N light sources 51-1 to 51-N for outputting N kinds of optical wavelengths, a multiplexing and branching section 52, wavelength filter sections 53-1 to 53-M, and a wavelength setting control section 54.

The multiplexing and branching section 52 multiplexes the lights from the N light sources to produce a multiplexed light including N kinds of optical wavelength components, and branches the multiplexed light into M×N lights to output them as multiplexed and distributed lights.

Each of the wavelength filter sections 53-1 to 53-M is designed to distributively receive N multiplexed and distributed lights of the M×N multiplexed and distributed lights branched in the multiplexing and branching section 52 and further to output N lights in a manner that only arbitrary wavelengths of N kinds of optical wavelengths pass therethrough.

The wavelength setting control section 54 sets the optical wavelengths passing through the respective wavelength filter sections 53-1 to 53-M so that they differ from each other.

The N lights from the M wavelength filter sections 53-1 to 53-M are given as input lights to the optical reproduction relay sections 20-1 to 20-M, respectively.

Accordingly, the optical cross connect unit 100 according to this invention is composed of M wavelength separating sections 10-1 to 10-M for receiving multiplexed optical signals each having N kinds of wavelengths different from each other through M optical fibers, respectively, and for wavelength-separating each of the multiplexed optical signals into N optical signals, M optical reproduction relay sections 20-1 to 20-M each for conducting an optical reproduction and relay in a manner of making a conversion of each of the N optical signals, wavelength-separated in each of the wavelength separating sections 10-1 to 10-M, into an electric signal and then modulating it with a desired optical wavelength, a refill section 30 for mutually refilling M optical signals optically reproduced and relayed in each of the optical reproduction relay sections 20-1 to 20-M, a focusing section 40 for focusing the M optical signals refilled in the refill section 30, and a light source unit 50 for supplying input lights having desired wavelengths to be modulated in the M optical reproduction relay sections 20-1 to 20-M.

In this optical cross connect unit 100, the light source unit 50 includes N light sources 51-1 to 51-N for outputting lights having the N kinds of optical wavelengths, a multiplexing and branching section 52 for multiplexing the lights from the N light sources 51-1 to 51-N to produce a multiplexed light having N kinds of optical wavelength components and further for branching the multiplexed light into M×N lights to output them as multiplexed and distributed lights, M wavelength filter sections 53-1 to 53-M for distributively receiving N multiplexed and distributed lights of the M×N multiplexed and distributed lights branched in the multiplexing and branching section 52 to output N lights due to the passage of only arbitrary wavelengths of the N kinds of optical wavelengths, and a wavelength setting control section 54 for setting optical wavelengths, which pass through each of the wavelength filter sections 53-1 to 53-M, so that they differ from each other, with the N lights from each of the M wavelength filter sections 53-1 to 53-M being supplied as the input lights. Thus, a set of light sources can generate a large number of wavelength multiplexed signals so that the control/management of the light source wavelengths become easy and the arbitrary wavelength selection becomes possible in the wavelength filter sections 53-1 to 53-M, which enhances the extension of the optical cross connect unit itself and increases the number of wavelengths to be distributed at a low cost.

(b) Description of First Embodiment

Embodiments of this invention will be described hereinbelow with reference to the drawings.

Figure 2:
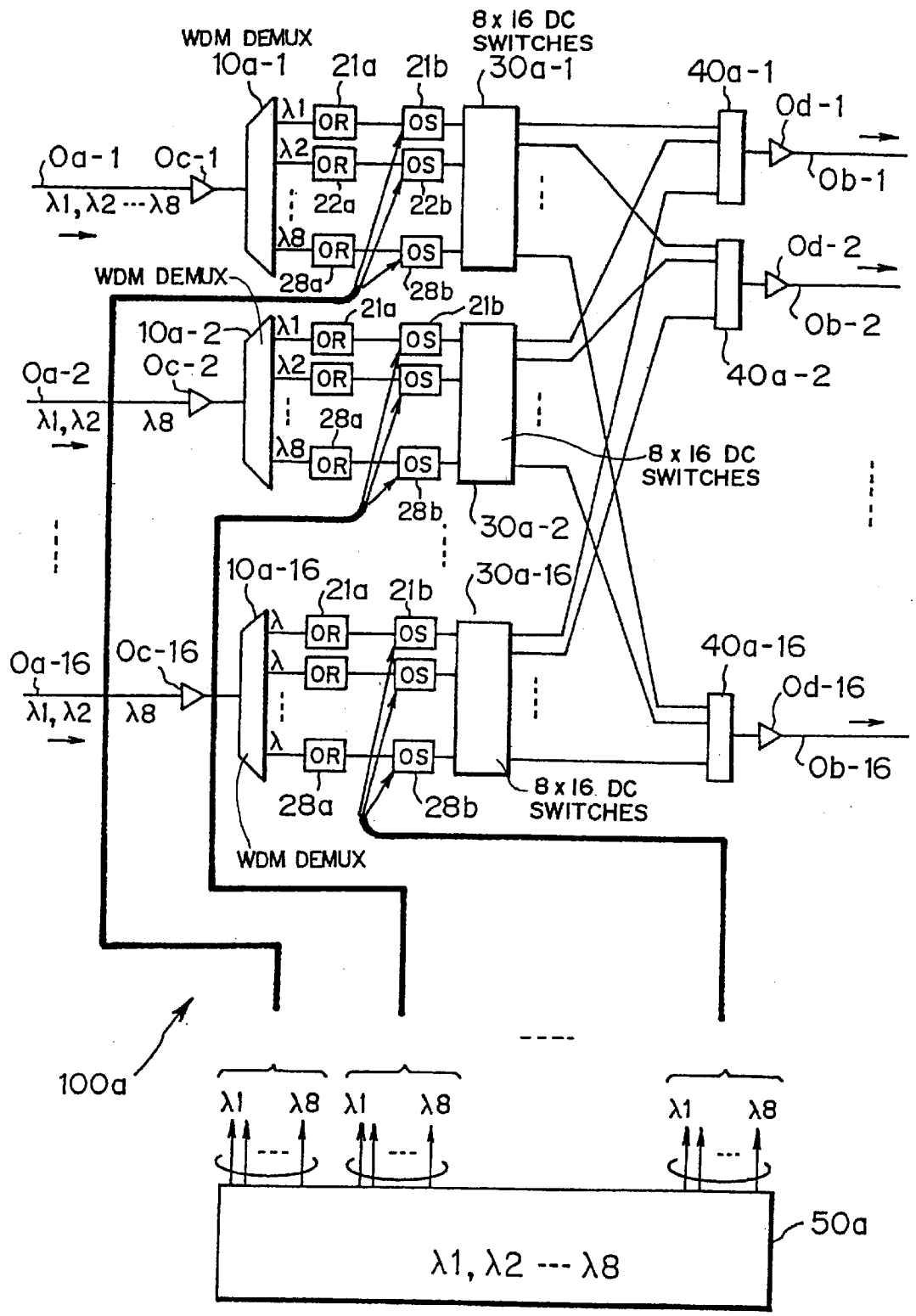
FIG. 2 is a block diagram showing an optical cross connect unit according to a first embodiment of this invention.

FIG. 2 is a block diagram showing an optical cross connect unit 100a according to a first embodiment of this invention. As shown in FIG. 2, the optical cross connect unit 100a is, at its inlet and outlet sides, coupled to 16 optical fibers 0a-1 to 0a-16 and 0b-1 to 0b-16.

Each of the optical fibers 0a-1 to 0a-16 and 0b-1 to 0b-16 is made to forward 8 kinds of wavelengths $\lambda 1$ to $\lambda 8$ different from each other.

Taking into consideration that 16 kinds of wavelength multiplexed signals are transmitted through 16 optical fibers, for the convenience of description, the optical fiber 0a-1 and the optical fiber 0b-1 are related to each other and taken as 1 system (which will be referred hereinafter to as "#1"). Accordingly, since 16 optical fibers are connected to each of the inlet and outlet sides of the optical cross connect unit 100a, the optical cross connect unit 100a contains 16 systems in total.

A description will be made hereinbelow in terms of a wavelength multiplexed signal coming in through the optical fiber 0a-1 and a wavelength multiplexed signal getting out toward the optical fiber 0b-1, that is, #1.

For #1, the optical cross connect unit 100a is equipped with amplifiers 0c-1, 0d-1, a dumultiplexer (WDM DEMUX) 10a-1, ORs 21a–28a, OSs 21b to 28b, an 8×16 DC switch 30a-1, a coupler 40a-1 and a light source unit 50a.

The demultiplexer 10a-1 is for the purpose of demultiplexing a wavelength multiplexed signal in accordance with every wavelength.

The OR 21a serving as a photoelectric converter which is for converting the wavelength $\lambda 1$ into an electric signal. Similarly, the ORs 22a to 28a make conversion of the wavelengths $\lambda 2$ to $\lambda 8$ into electric signals.

The OS 21b acts as a modulator which performs the modulation of lights with given wavelengths coming from the light source unit 50a on the basis of the electric signal converted in the OR 21a. Further, the OSs 21a to 28a are made to forward light with a optical wavelength $\lambda b$ different from a optical wavelength $\lambda a$ ($\lambda a \neq \lambda b$) before the conversion into the electric signal or with the optical wavelength $\lambda a$ equal to the previous optical wavelength $\lambda a$ to the 8×16 DC switch 30a-1. The optical wavelength from the light source unit 50a is not always $\lambda a$. Besides, the other OSs 22b to 28b likewise modulate the supplied optical wavelengths and send the modulation results to the 8×16 DC switch 30a-1.

That is, when the optical signal converted into the electric signal in the OR 21a is outputted to an optical fiber in a different system (other than #1), there is a case of changing to a different wavelength, and therefore, the OS 21b newly produces an optical signal.

The 8×16 DC switch 30a-1 is for the purpose of conducting the switching control of the output direction so that the optical signal newly produced in each of the OSs 21b to 28b can be transmitted toward the desired one of the optical fibers 0b-1 to 0b-16.

The coupler 40a-1 is for multiplexing the optical wavelengths to be transmitted from the 8×16 DC switches 30a-1 to 30a-16 through the optical fiber 0b-1.

Incidentally, as in the case of the optical fiber 0a-1 (#1), the above-described arrangement (see numerals 10a-1, 21a to 28a, 21b to 28b, 30a-1, 40a-1, 0c-1, 0d-1) is similarly taken for the respective optical fibers 0a-2 to 0a-16 (#2 to #16). For the convenience of explanation, in the following description for the above-mentioned arrangement, the components corresponding to the optical fibers 0a-1 to 0a-16 may be marked with #1 to #16. For instance, an expression is made such that "a demultiplexer 10a-1#1" which separates wavelength multiplexed signals from the optical fiber 0a-1.

In this connection, the 16 8×16 DC switches 30a-1 to 30a-16 performs the switching operations at every wavelength in conjunction with each other for determining the outlet side optical fibers 0b-1 to 0b-16 to be used for transmitting 126 optical signals created by separating the respective wavelength multiplexed signals from the 16 optical fibers 0a-1 to 0a-16 in accordance with every wavelength.

The light source unit 50a is for outputting desired optical wavelengths to the OSs 21b to 28b.

Figure 3:
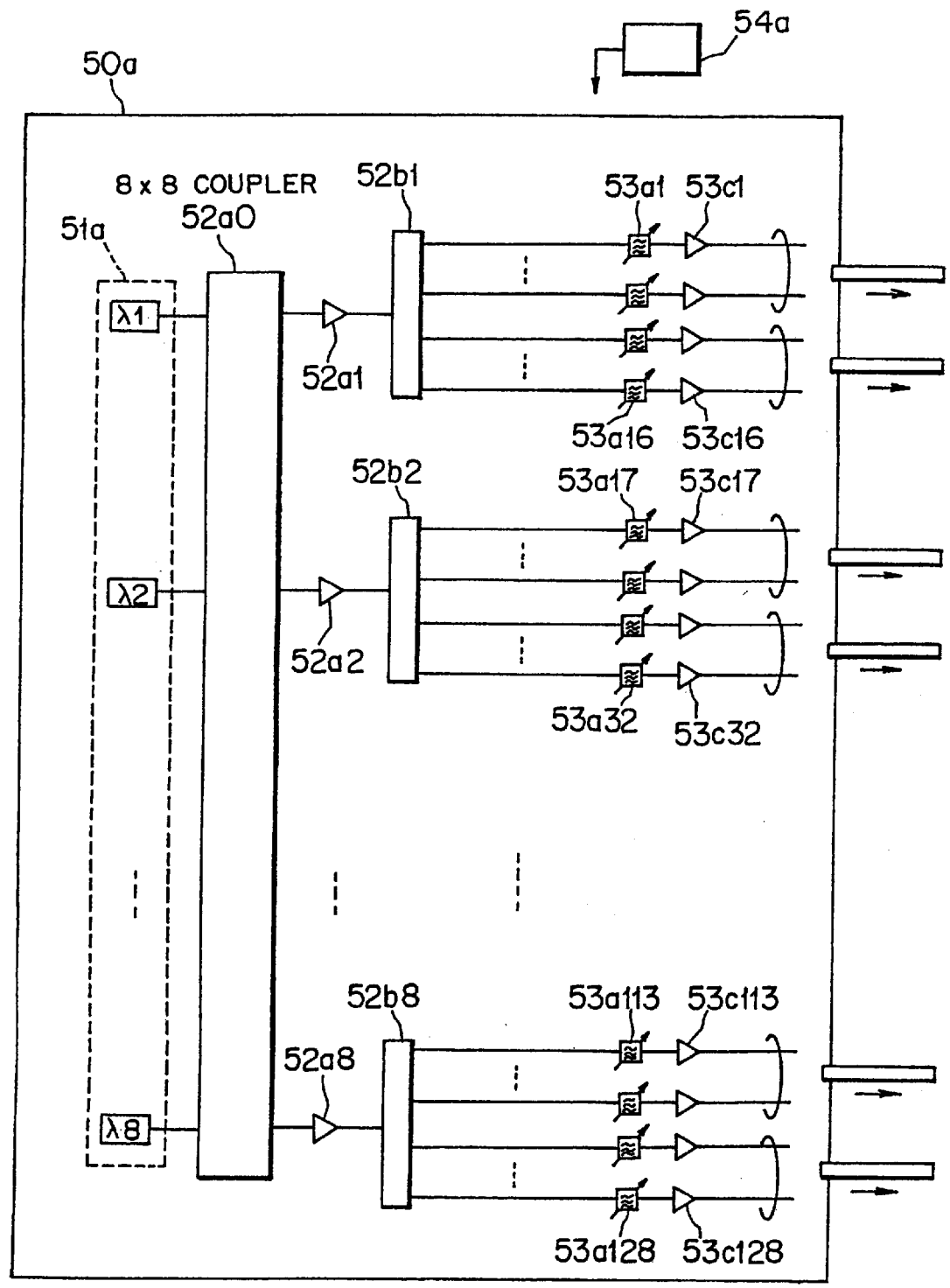
FIG. 3 is a block diagram showing a light source unit according to the first embodiment of this invention.

FIG. 3 is a block diagram showing the light source unit 50a according to the first embodiment. As shown in FIG. 3, the light source unit 50a is composed of 8 different LD (Laser Diode) light sources (which will be referred hereinafter to as an LD array) 51a for outputting optical wavelengths different from each other, an 8×8 coupler 52a0, amplifiers 52a1 to 52a8 for amplifying output values, 8 1×16 couplers 52b1 to 52b8, 128 tunable filters 53a1 to 53a128, 128 amplifiers 53c1 to 53c128, and a wavelength setting control means 54a.

The 8×8 coupler 52a0 is designed to multiplex the 8 kinds of different optical wavelengths from the LD array 51a, and further to power-branch the multiplexed light into at least 8.

Each of the 1×16 couplers 52b1 to 52b8 power-branches the multiplexed light from the 8×8 coupler 52a0 into 16.

Each of the tunable filters 53a1 to 53a128 allows light with a given wavelength of the multiplexed light branched in the series-connected 1×16 couplers 52b1 to 52b8 to pass, and is under control of the wavelength setting control means 54a at the passage of the light with the given wavelength.

The amplifiers 53c1 to 53c128 amplify the optical wavelength powers from the tunable filters 53a1 to 53a128 connected in series thereto, respectively.

The lights passing through the tunable filters 53a1 to 53a8 are inputted to the OSs 21b to 28b, respectively. That is, the light after the passage of the tunable filter 53a1 is forwarded to the OS 21b.

The wavelength setting control means 54a executes control whereby desired lights pass through the tunable filters 53a1 to 53a128, for example, controls the tunable filters 53a1 to 53a128 so that the optical wavelengths passing through the tunable filters 53a1 to 53a128 are different from each other.

Figure 4:
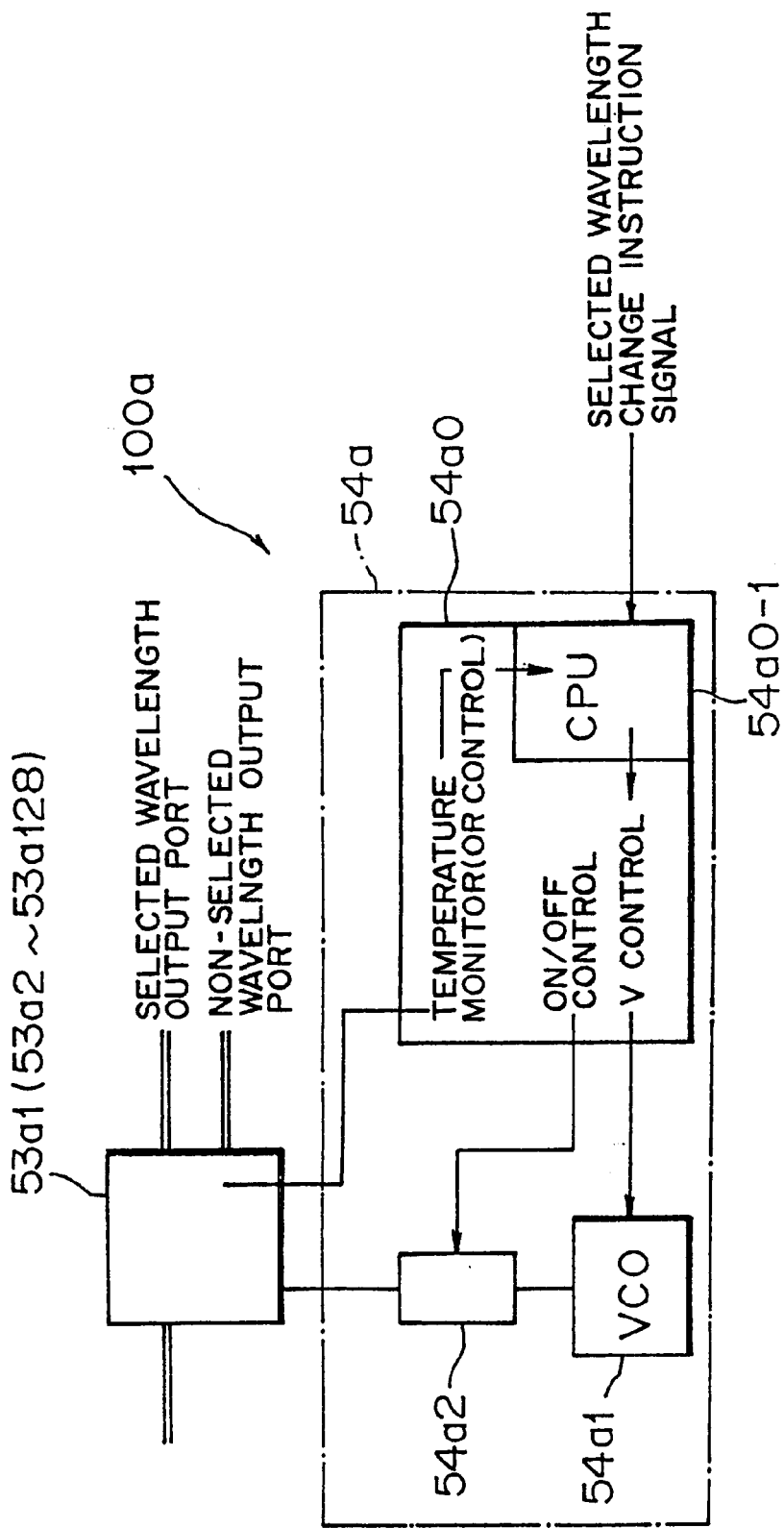
FIG. 4 is a block diagram showing a wavelength setting control means according to the first embodiment of this invention.

FIG. 4 is a block diagram showing the wavelength setting control means 54a according to the first embodiment of this invention. As shown in FIG. 4, the wavelength setting control means 54a is provided with a control section 54a0, a voltage controlled oscillator (which will be referred hereinafter to as a VCO) 54a1, and a switch 54a2.

In this composition, the control section 54a0 comprises a CPU (Central Processing Unit) 54a0-1. The CPU 54a0-1 of the control section 54a0 performs control of the switch 54a2 and the VCO 54a1 on the basis of the information indicative of the ambient temperature of the tunable filters 53a1 to 53a128 and a selected wavelength changing instruction signal from a CPU (not shown) taking the charge of control of the system.

The switch 54a2, in accordance with the control of the control section 54a0, takes the ON/OFF switching operation to establish or cut the transmission of the output frequency from the VCO 54a1 to the tunable filters 53a1 to 53a128, whereas the VCO 54a1 controls the output frequency to be transmitted to the tunable filters 53a1 to 53a128 under the control of the control section 54a0.

With this arrangement, the demultiplexer 10a-1 demodulates the multiplexed signal transmitted through the optical fiber 0a-1 in accordance with every wavelength. Each of the ORs 21a to 28a converts the optical signal demultiplexed in the demultiplexer 10a-1 into an electric signal, and further forwards the electric signal to the corresponding one of the OSs 21b to 28b coupled in series thereto.

On the other hand, the light source unit 50a emits lights with desired wavelengths to the OSs 21b to 28b. At this time, in the light source unit 50a, the 8×8 coupler 52a0 multiplexes the different optical wavelengths from the LD array 51a, and further power-branches the multiplexed light into at least 8.

Each of the 1×16 couplers 52b1 to 52b8 receives the optical signal branched in the 8×8 coupler 52a0 through the corresponding one of the amplifiers 52a1 to 52a8 connected in series thereto, and further power-branches it into 16.

In more detail, the 8×8 coupler 52a0 and the 8 1×16 couplers 52b1 to 52b8 exert a multiplexing and branching section to multiplex the lights from the LD array 51a to produce the multiplexed light having 8 kinds of optical wavelength components and further to output as multiplexed and distributed lights the multiplexed light power-distributed into 16×8.

The wavelength setting control means 54a controls the tunable filters 53a1 to 53a128 so that arbitrary optical wavelengths can pass through the tunable filters 53a1 to 53a128.

The tunable filters 53a1 to 53a8 corresponding to the OSs 21a to 21a8 of #1 permit desired optical wavelengths of the optical wavelengths from the 1×16 coupler 52b1 to pass, under the control of the wavelength setting control means 54a. In this case, in the light source unit 50a, the lights passing through the tunable filters 53a1 to 53a8 are outputted to the OSs 21b to 28b, respectively. That is, the light passing through the tunable filter 53a1 is fed to the OS 21a after amplified up to a desired power in the amplifier 53c1.

In a similar way, the tunable filters 53a9 to 53a16 corresponding to the OSs 21a#2 to 28a#2 of #2 allow the desired optical wavelengths of the optical wavelengths from the 1×16 coupler 52b2 to pass, under the control of the wavelength setting control means 54a. Taking the tunable filter 53a16 for example, the light source unit 50a transmits the light passing through the tunable filter 53a16 to the OS 28a#2. Further, likewise, the tunable filters 53a121 to 53a128 corresponding to the OSs 21a#16 to 28a#16 of #16 permit the desired optical wavelengths of the optical wavelengths from 1×16 coupler 52b8 to pass, under the control of the wavelength setting control means 54a. Taking the tunable filter 53a16 for example, the light source unit 50a transmits the light passing through the tunable filter 53a16 to the OS 28a#16.

In this way, the 8 sets of tunable wavelength filters 53a1 to 53a128 serve as 16 wavelength filter sections to distributively receive 8 multiplexed and branched lights of 16×8 multiplexed and branched lights branched in the 8×8 coupler 52a0 and 1×16 couplers 52b1 to 52b8 acting as a multiplexing and branching section and further to output 8 lights due to the passage of only the arbitrary wavelengths of the 8 kinds of optical wavelengths.

Under the control of the wavelength setting control means 54a, each of the tunable filters 53a1 to 53a8 (similarly, in the #2 to #16) of the light source unit 50a permits a desired optical wavelength to pass, and output the optical wavelength to the corresponding one of the OSs 21b#1 to 28b#1 (#2 to #16). When the wavelength setting control means 54a selects the wavelengths, in response to the reception of a selected wavelength changing instruction signal, it OFF-controls the switch 54a2, and obtains, through the use of a temperature monitor, a correction value to be added to the oscillation frequency at a reference temperature to determine a frequency for the selected wavelength, thus voltage-controlling the VCO 54a1 to provide a given oscillation frequency.

The switch 54a2, in response to the ON control from the control section 54a0, outputs the desired frequency, generated by the VCO 54a1 under the voltage control from the control section 54a0, to the tunable filters 53a1 to 53a128.

In this way, the wavelength setting control means 54a controls the respective tunable filters 53a1 to 53a8 so that the desired optical wavelengths are given to the OSs 21b to 28b. That is, the wavelength setting control means 54a functions as a wavelength setting control section to set the optical wavelengths which pass through the wavelength filter sections.

Furthermore, each of the OSs 21b#1 to 28b#1 modulates the optical wavelength from the light source unit 50a on the basis of an electric signal and output it to the 8×16 DC switch 30a-1#1.

As mentioned above, the ORs 21a#1 to 28a#1 and the OSs 21b#1 to 28b#1 (in FIG. 2, numeral 20a-1) serve as an optical reproduction relay section having the 8 ORs 21a#1 to 28a#1 for respectively converting the 8 optical signals wavelength-separated in the demultiplexer 10a-1 into electric signals and further having the 8 OSs 21b#1 to 28b#1 for modulating the input lights on the basis of the electric signals from the 8 ORs 21a#1 to 28a#1 to output the modulated input lights to the 8×16 DC switch 30a-1#1. Further, in the optical cross connect unit 100a according to this invention, since the same elements as ORs 21a to 28a and the OSs 21b to 28b are provided for the multiplexed lights from the other optical fibers 0a-2 to 0a-16, the 16 sets of 8 ORs 21a to 28a (#1 to #16) and 8 OSs 21b to 28b (#1 to #16) [see numerals 20a-1 to 20a-16] serve as 16 optical reproduction relay sections to perform the optical reproduction relay by respectively converting the 8 optical signals wavelength-separated in the demultiplexer 10a-1 into the electric signals and then by modulating them with desired optical wavelengths. Incidentally, in the following description, the portion designated at numerals 20a-1 to 20a-16 may be referred to as "16 optical reproduction relay sections 20a-1 to 20a-16".

The 8×16 DC switch 30a-#1 transmits the optical signal, newly produced in each of the OSs 21b#1 to 28b#1, to given 16×1 couplers 40a-1 to -16 so that they are transmitted through the given optical fibers 0b-1 to 0b-16.

The 8 8×16 DC switches 30a-1 to 30a-16 respectively transmit the newly produced optical signals to the given 16×1 couplers 40a-1 to -16 so that they are transmitted through the given optical fibers 0b-1 to 0b-16. In other words, the 8 8×16 DC switches 30a-1 to 30a-16 rearrange 128 data included in the received multiplexed lights.

In this way, the 8 8×16 DC switches 30a-1 to 30a-16 function as refill sections to mutually refill 16 optical signals optically reproduced and relayed in the ORs and OSs acting as the respective optical reproduction relay sections.

The 16×1 coupler 40a-1 multiplexes the optical signals from the respective 8×16 DC switches 30a-1 to 30a-16 to output the multiplexing result to the fiber 0b-1. Each of the 16 16×1 couplers 40a-1 to 40a-16 multiplex the newly produced optical signals from the 8×16 DC switches 30a-1 to 30a-16 and outputs the wavelength multiplexed signals to the optical fibers 0b-1 to 0b-16.

As mentioned above, the 16 16×1 couplers 40a-1 to 40a-16 serve as focusing sections to focus the 16 optical signals refilled in the 16 8×16 DC switches 30a-1 to 30a-16 being the refill sections.

Thus, in the optical cross connect unit 100a according to the first embodiment of this invention, when reproducing the lights in each of the 8 ORs 21a to 28a and 8 OSs 21b–28b constituting the 16 optical reproduction relay sections 20a-1 to 20a-16, the LD light sources (LD array 51a) themselves are used in common for the optical wavelengths to be employed and the distributed light sources of the light source unit 50a are used as transmission light sources, the 16×8 modulators (OSs) 21b to 28b (#1 to #16) can transmit arbitrary wavelengths, and 8 LDs do as light sources to be prepared, with the result that the unit leads to a simple arrangement and the manufacturing cost comes down. In addition, there is an effect that, as the number of distributions from the light source unit 50a decreases, the cost per signal decreases proportionally.

Moreover, although the wavelength management is essential in the wavelength multiplexing transmission, since the 8 LDs can work for the light source unit 50a, as compared with the preparation of 16×8 light sources, the number of light sources decreases, which can lessen the operations such as the wavelength management, the wavelength control and the wavelength monitoring, so that the management becomes facilitated.

(b1) Description of First Modification of First Embodiment

An optical cross connect unit 100a1 according to a first modification of the first embodiment of this invention differs from the above-described optical cross connect unit 100a according to the first embodiment in that a light source unit 50a1 is employed in place of the light source unit 50a, and the other arrangement (numerals 0a-1 to 0a-16, 10a-1 to 10a-16, 21a to 28a, 21b to 28b, 30a-1 to 30a-16, 40a-1 to 40a-16, 0b-1 to 0b-16 and others) is the same.

The description of the same components as those in the above-mentioned first embodiment (b) will be omitted for brevity.

Figure 5:
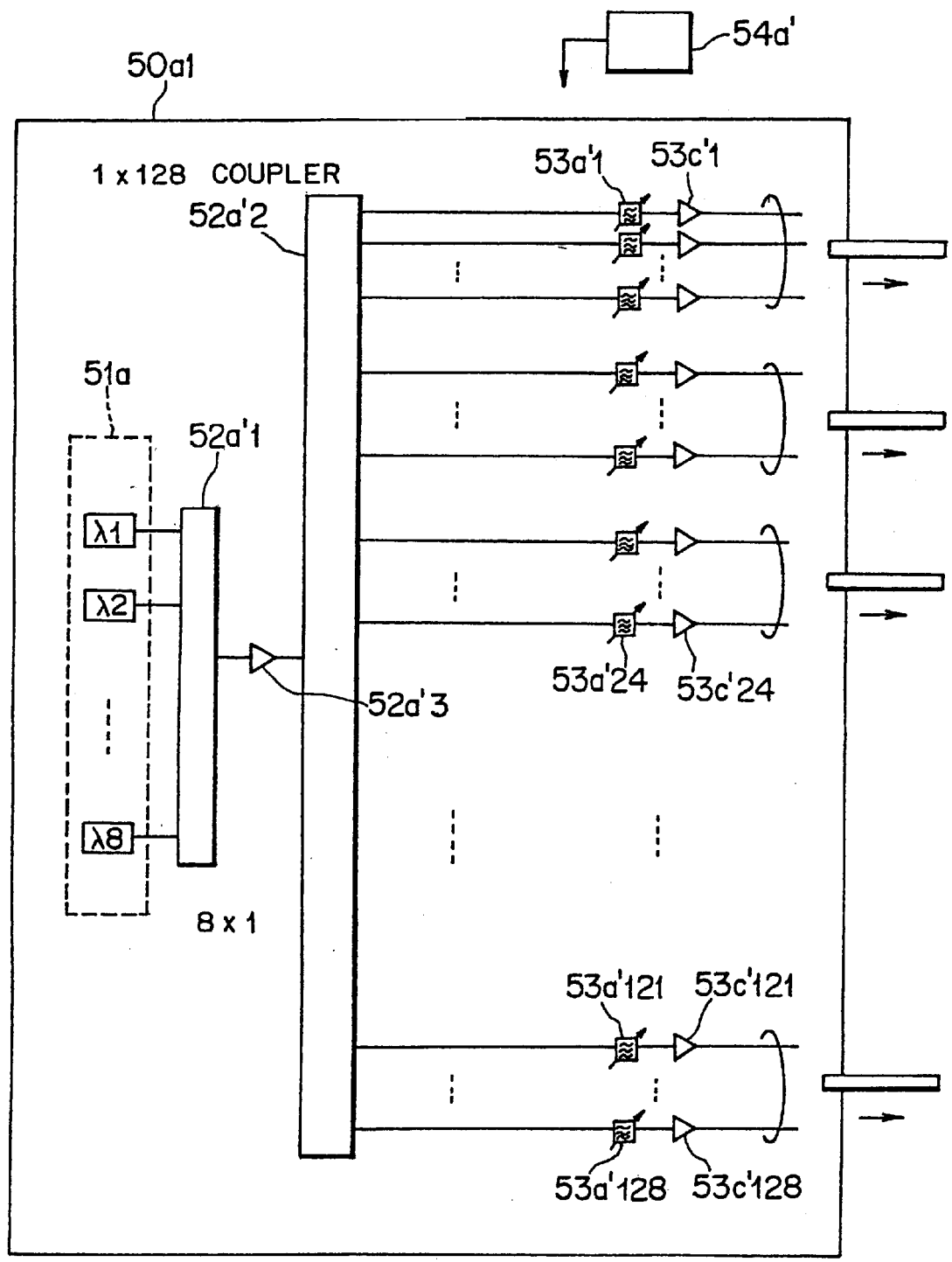
FIG. 5 is a block diagram showing a light source unit according to a first modification of the first embodiment of this invention.

FIG. 5 is a block diagram showing a light source unit 50a1 according to the first modification of the first embodiment of this invention. As shown in FIG. 5, the light source unit 50a1 is made up of an LD array 51a, an 8×1 coupler 52a'1, an amplifier 52a'3 for amplifying a power value of a multiplexed light, a 1×128 coupler 52a'2, tunable filters 53a'1 to 53a'128, amplifiers 53c'1 to 53c'128 for amplifying a light output with a given wavelength, and a wavelength setting control means 54a.

The 8×1 coupler 52a'1 is for the purpose of producing one multiplexed light from optical wavelengths outputted from LD light sources of the LD array 51a which generate 8 kinds of optical wavelengths different from each other, whereas the 1×128 coupler 52a'2 is for power-branching the multiplexed light produced in the 8×1 coupler 52a'1 through the amplifier 52a'3 into 128.

In other words, the 8×1 coupler 52a'1 functions as a multiplexing coupler section for multiplexing the lights from 8 light sources provided in a multiplexing and branching section, while the 1×128 coupler 52a'2 serves as a branching coupler section for branching the multiplexed light outputted from the 8×1 coupler 52a'1 into 16×8 lights.

The tunable filters 53a'1 to 53a'8, as well as the above-mentioned tunable filters 53a1#1 to 53a8#1, allow desired wavelengths to pass, under the control of the wavelength setting control means 54a, and output them to OSs 21b#1 to 28b#1, respectively. Taking the tunable filter 53a-8 for instance, the light source unit 50a' is designed to transmit the light passing through the tunable filter 53a'-8 through the amplifier 53c'8 to the OS 28b#1.

Likewise, the tunable filters 53a'9 to 53a'128 in FIG. 5 are made to allow the passage of desired wavelengths of the multiplexd light branched in the 1×128 coupler 52a'2 and to transmit given lights to given OSs 21b to 28b (#2 to #16), respectively.

With the above-described arrangement, in the optical cross connect unit 100a1 according to the first modification of the first embodiment of this invention, the 8×1 coupler 52a' 1 multiplexes the 8 kinds of lights different in wavelength from each other coming from the LD array 51a acting as light sources, while the 1×128 coupler 52a'2 power-branches the multiplexed light amplified in the amplifier 52a'3 into 128.

The tunable filters 53a'1#1 to 53a'8#1 output the desired optical wavelengths to the OSs 21b#1 to 28b#8 under the control of the wavelength setting control means 54a, respectively. Taking the tunable filter 53a'1 for instance, the light passing through the tunable filter 53a'1 is forwarded to the OS 21b#1.

In this way, in the optical cross connect unit 100a1 according to the first modification of the first embodiment of this invention, without depending upon 128 LDs, the 8 LDs for outputting optical wavelengths different from each other are employed for the optical wavelengths to be taken for when reproducing optical signals with different frequencies in the OSs 21b to 28b (#1 to #16), with the result that the arrangement of the unit becomes simple and the manufacturing cost is reducible. In addition, as the number of distributions from the light source unit 50a1 increases, the cost per signal reduces proportionally.

Moreover, although the wavelength management is essential in the wavelength multiplexing transmission, since the 8 LDs can do for the light source unit 50a1, as compared with the preparation of 16×8 light sources, the number of light sources decreases, which can lessen the operations such as the wavelength management, the wavelength control and the wavelength monitoring, so that the management becomes facilitated.

(b2) Description of Second Modification of First Embodiment

One difference of an optical cross connect unit 100a2 according to a second modification of the first embodiment of this invention from the above-described units is that a wavelength stabilizing circuit 55 is added to the light source unit 50a of the optical cross connect unit 100a according to the first embodiment to provide a light source arrangement (which will be referred hereinafter to as a light source unit 50a2).

The description of the same components as those in the above-mentioned first embodiment (b) will be omitted for brevity.

Figure 6:
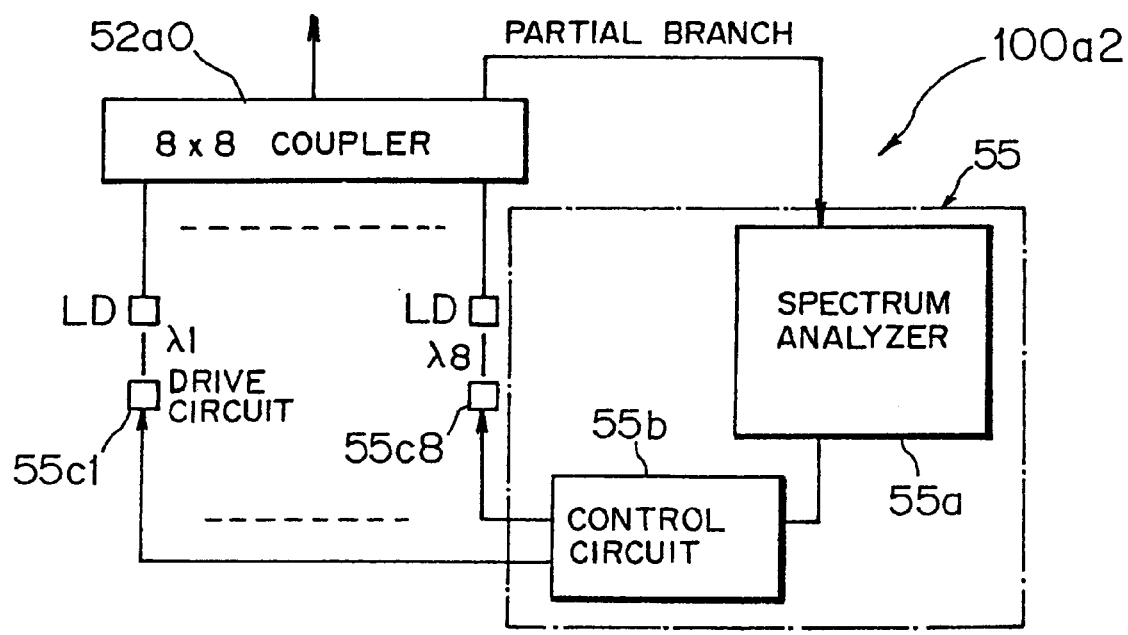
FIG. 6 is a block diagram showing a wavelength stabilizing circuit according to a second modification of the first embodiment of this invention.

FIG. 6 is a block diagram showing a wavelength stabilizing circuit 55 according to the second modification of the first embodiment of this invention. In FIG. 6, the wavelength stabilizing circuit 55 is composed of a spectrum analyzer 55a, a control circuit 55b, and drive circuits 55c1 to 55c8.

In this case, an 8×8 coupler 52a0 is designed to branch at least 8+1 multiplexed lights.

The spectrum analyzer 55a monitors one multiplexed light of branched lights from the 8×8 coupler 52a0 to read out the wavelength from each of LD light sources, and sends the wavelength data to the control circuit 55b. The control circuit 55b calculates an error between each signal wavelength and a predetermined set value on the basis of the wavelength data on each of the LD light sources from the spectrum analyzer 55a, and sends an error signal corresponding thereto toward the corresponding one of the LD drive circuits 55c1 to 55c8 for the LD light sources.

Each of the LD drive circuits 55c1 to 55c8 drives the corresponding LD light source so that the LD light source emits light with a given wavelength.

With this arrangement, in the optical cross connect unit 100a2 according to the second modification of the first embodiment of this invention, the spectrum analyzer 55a in the wavelength stabilizing circuit 55 monitors the branched lights from the 8×8 coupler 52a0 (step 1), and further monitors the optical wavelengths from the respective LD light sources to send the optical wavelength data due to the LD light sources to the control circuit 55b (step 2).

The control circuit 55b calculates an error from a specific wavelength value predetermined for each of the LD light sources, and transmits an error signal corresponding thereto toward the corresponding one of the drive circuits 55c1 to 55c8 for the LD light sources (step 3).

In response to the reception of the error signal from the control circuit 55b, each of the drive circuits 55c1 to 55c8 for the LD light sources adjusts a drive current (or temperature) or the like to the corresponding LD light sources (step 4).

As obvious from the above description, the wavelength stabilizing circuit 55 functions as a wavelength stabilizing section to stabilize the optical wavelengths from the respective LD light sources on the basis of the multiplexed and branched lights outputted from the 8×8 coupler 52a0.

Incidentally, the wavelength stabilizing circuit 55 accomplishes the stabilization of the wavelengths by the repletion of the above-mentioned steps 1 to 4.

Thus, in the optical cross connect unit 100a2 according to the second modification of the first embodiment of this invention, without depending upon 128 LDs, the 8 LDs for outputting optical wavelengths different from each other are employed for the optical wavelengths to be taken for when reproducing optical signals with different frequencies in the OSs 21b to 28b (#1 to #16), with the result that the arrangement of the unit becomes simple and the manufacturing cost is reducible. In addition, as the number of distributions from the light source unit 50a2 increases, the cost per signal reduces proportionally.

Moreover, although the wavelength management is essential in the wavelength multiplexing transmission, since the 8 LDs can do for the light source unit 50a2, as compared with the preparation of 16×8 light sources, the number of light sources decreases, which can lessen the operations such as the wavelength management, the wavelength control and the wavelength monitoring, so that the management becomes facilitated.

Besides, through the use of the wavelength stabilizing circuit 55, it is possible to achieve the sufficient stability of the light source wavelengths.

(b3) Description of Third Modification of First Embodiment

One difference of an optical cross connect unit 100a3 according to a third modification of the first embodiment of this invention from the above-described optical cross connect unit 100a according to the first embodiment is that, in addition to the arrangement of the light source unit 50a, its light source unit 50a3 is provided with a spare light source array 51a1, a switch 51c, an optical switch 51d, a 1×128 coupler 52a'2, tunable filters 53a'1 to 53a'128, amplifiers 53c'1 to 53c'128, and a wavelength stabilizing circuit 55-1.

The description of the same components as those in the above-mentioned optical cross connect units (b) to (b2) will be omitted for brevity.

Figure 7:
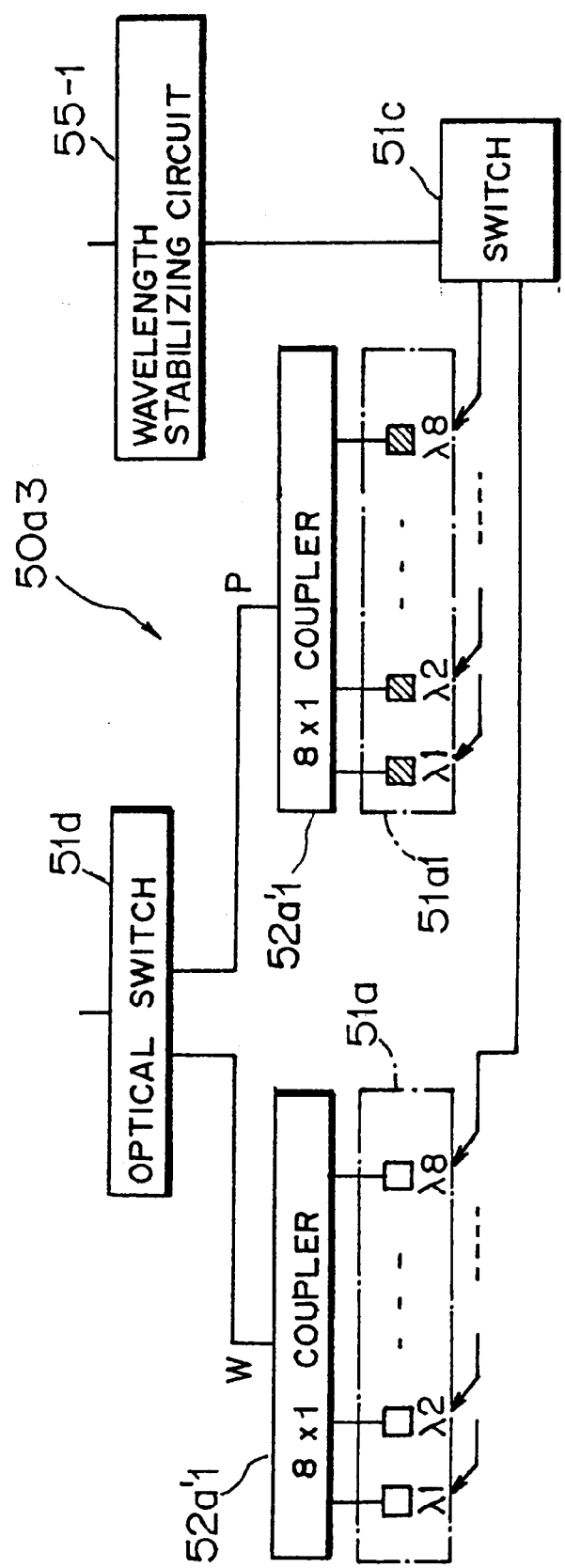
FIG. 7 is a block diagram showing a light source unit according to a third modification of the first embodiment of this invention.

FIG. 7 is a block diagram showing the light source unit 50a3 according to the third modification of the first embodiment of this invention.

The spare light source 51a1 serving as a spare light source section is made to output light with the same wavelength as that of the disabled LD of the 8 LDs of the light source 51a.

The wavelength stabilizing circuit 55-1 has the same arrangement as that of the above-described wavelength stabilizing circuit 55 in the second modification of the first embodiment, but a control circuit 55b is for the purpose of detecting the absence of lights from LD light sources on the basis of the data on the wavelengths of the LD light sources from a spectrum analyzer 55a, and is for, when detecting the wavelength absent in the multiplexed light, deciding that the LD for outputting the light with the absent wavelength is out of order and for performing the switching operation of the optical switch 51d from the work (operating) system (which will sometimes be referred hereinafter to as a W system) to the protection (standby) system (which will sometimes be referred hereinafter to as a P system).

Under the control of the control circuit 55b, the optical switch 51d has a switching function to choose one from the multiplexed light from the P system and the multiplexed light from the W system in outputting the multiplexed light to the 1×128 coupler. 52a'2.

Further, under the control of the control circuit 55b, the switch 51c conducts the switching from an LD array 51a of the work system to the LD array 51a1 of the protection system as light sources to be placed into operation.

With the above-described arrangement, in the optical cross connect unit 100a3 according to the third modification of the first embodiment of this invention, the spectrum analyzer 55a in the wavelength stabilizing circuit 55-1 monitors the multiplexed light outputted from the LD array 51 a in the W system chosen by the optical switch 51d, and transmits the obtained data to the control circuit 55b. The control circuit 55b, when detecting the absence of some wavelength of the multiplexed light, makes a decision to that the LD light source for outputting the light with the absent wavelength is out of order.

Furthermore, the control circuit 55b controls the optical switch 51d for switching from the W system to the P system. In addition, the control circuit 55b controls the switch 51c so that the destination of a control signal is switched from the W system to the P system.

Under the control of the control circuit 55b, the switch 51c conducts the switching operation of the destination of the control signal from the LD array 51a in the W system to the LD array 51a1 in the P system, whereas the optical switch 51d performs the switching operation from the W system to the P system in outputting the multiplexed light to the 1×128 coupler 52a'2. The drive circuits (not shown in FIG. 7) for driving the LD array 51a1 in the P system, in response to the reception of a switching signal for the switch 51c, controls the switch 51c under the control of the wavelength stabilizing circuit 55a' so that each of the LD light sources emits light with a given wavelength.

Accordingly, since the optical cross connect unit 100a3 according to the third modification of the first embodiment of this invention employs 8 LD light sources in the W (operating) system and 8 LD light sources in the P (standby) system, which respectively output optical wavelengths different from each other, with no use of 128 LDs, the unit arrangement becomes simplified and the manufacturing cost is reducible. In addition, as the number of distributions from the light source unit 50a3 increases, the cost per signal reduces proportionally.

Moreover, although the wavelength management is essential in the wavelength multiplexing transmission, since the 8 LDs can do for the light source unit 50a3, as compared with the preparation of 16×8 light sources, the number of light sources decreases, which can lessen the operations such as the wavelength management, the wavelength control and the wavelength monitoring, so that the management is expectable to be facilitated.

Besides, through the equipment of the wavelength stabilizing circuit 55-1, it is possible to ensure the sufficient stability of the light source wavelengths, and because of the preparation of the spare light sources, it is possible to prevent the broken conditions of the light sources themselves.

(b4) Description of Fourth Modification of First Embodiment

One difference of an optical cross connect unit 100a4 according to a fourth modification of the first embodiment of this invention from the above-described optical cross connect unit 100a according to the first embodiment is that, in addition to the arrangement of the light source unit 50a, its light source unit 50a4 is provided with spare light sources 51a-1 to 51a-8, switches 51c1 to 51c8, optical switches 51d1 to 51d8, 1×128 coupler 52a'2, tunable filters 53a'1 to 53a'128, amplifiers 53c'1 to 53c'128, and a wavelength stabilizing circuit 55-2.

The description of the same components as those in the above-mentioned optical cross connect units (b) to (b3) will be omitted for brevity.

Figure 8:
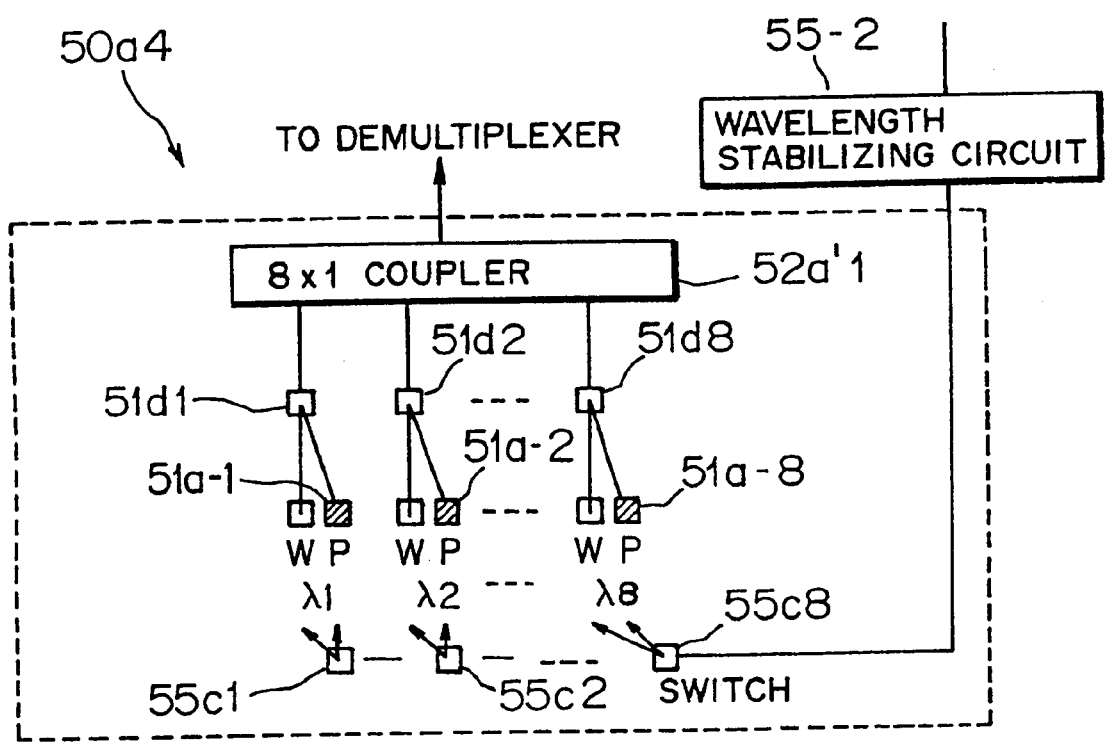
FIG. 8 is a block diagram showing a light source unit according to a fourth modification of the first embodiment of this invention.

FIG. 8 is a block diagram showing the light source unit 50a4 according to the fourth modification of the first embodiment of this invention.

In FIG. 8, the 1×128 coupler 52a'2, the tunable filters 53a'1 to 53a'128 and the amplifiers 53c'1 to 53c'128 are not shown, but they are used in the way shown in FIG. 5.

The wavelength stabilizing circuit 55-2 has the same arrangement as that of the above-described wavelength stabilizing circuit 55 in the second modification of the first embodiment, and a control circuit 55b is for the purpose of detecting the absence of lights from LD light sources on the basis of the data on the wavelengths of the LD light sources from a spectrum analyzer 55a, and is for, when detecting the wavelength absent in the multiplexed light, deciding that the LD for outputting the light with the absent wavelength is out of order and for performing the switching operation of the corresponding one of the optical switches 51d1 to 51d8 for the absent-wavelength outputting LD light source from the W system to the P system. For instance, in the case that no detection is made of the light to be emitted from the LD light source made to output the light with a wavelength λ2, the optical switch 51d2 is switched from the W system to the P system, while the other optical switches 51d1 and 51d3 to 51d8 remain in the W system.

Each of the optical switches 51d1 to 51d8 is made to take a switching action from the light from the W system to the light from the P system under the control of the control circuit 55b to send the light from the P system to the 1×128 coupler 52a'2.

Each of the switches 51c1 to 55c8, under the control of the control circuit 55b, take a switching action from the LD light source in the W system to the corresponding one of the LD light sources 51a-1 to 51a-8 in the P system as an operating light source.

With the above-described arrangement, in the optical cross connect unit 100a4 according to the fourth modification of the first embodiment of this invention, the spectrum analyzer 55a in the wavelength stabilizing circuit 55-2 monitors the multiplexed light of the respective LD light sources in the W system chosen through the switches 55c1 to 55c8, and transmits the data on the multiplexed light to the control circuit 55b. The control circuit 55b, when detecting the absence of one wavelength of the multiplexed light, makes a decision to that the LD light source for outputting the light with the absent wavelength is broken down.

The control circuit 55b controls one of the optical switches 51d1 to 51d8 coupled to the absent-wavelength light outputting LD light source so that the LD light source in the W system is switched to the corresponding light source in the P system. In addition, the control circuit 55b controls the switches 55c1 to 55c8 so that the destination of a control signal is switched from the W system to the P system.

Under the control of the control circuit 55b, the corresponding one of the switches 55c1 to 55c8 performs a switching operation of the destination of the control signal from a drive circuit (not shown in FIG. 8) for the LD light source in the W system to a drive circuit (not shown in FIG. 8) for the corresponding one of the LD light sources 51a-1 to 51a-8 in the P system, while the corresponding one of the optical switches 51d1 to 51d8 performs a switching operation from the W system to the P system so that the light from the P system is outputted to an 8×1 coupler 52a'1. In response to the reception of a switching signal for each of the switches 55c1 to 55c8, each of the drive circuits for driving the LD light sources 51a-1 to 51a-8 in the P system controls each of the LD light sources 51a-1 to 51a-8 so that the light with a given wavelength is outputted under the control of the wavelength stabilizing circuit 55-2.

In case that any one of the light sources in the W system is out of order, one of the spare LD light sources 51a-1 to 51a-8 functions a spare light source section which outputs the same wavelength as that of the out-of-order light source.

With this arrangement, since the optical cross connect unit 100a4 according to the fourth modification of the first embodiment of this invention employs 8 LD light sources in the W (operating) system and 8 LD light sources in the P (standby) system, which respectively output optical wavelengths different from each other, with no use of 128 LDs, the unit arrangement becomes simplified and the manufacturing cost is reducible. In addition, as the number of distributions from the light source unit 50a4 increases, the cost per signal reduces proportionally.

Moreover, although the wavelength management is essential in the wavelength multiplexing transmission, since the 8 LDs can do for the light source unit 50a4, as compared with the preparation of 16×8 light sources, the number of light sources decreases, which can lessen the operations such as the wavelength management, the wavelength control and the wavelength monitoring, so that the management is expectable to be facilitated.

Besides, through the equipment of the wavelength stabilizing circuit 55-2, it is possible to ensure the sufficient stability of the light source wavelengths, and because of the preparation of the spare light sources, it is possible to prevent the broken conditions of the light sources themselves.

(b5) Description of Fifth Modification of First Embodiment

An optical cross connect unit 100a5 according to a fifth modification of the first embodiment of this invention differs from the above-described optical cross connect unit 100a according to the first embodiment in that each of the optical reproduction relay sections 20a-1 to 20a-16 is further equipped with spare OSs 29b (#1 to #16) and the light source unit 50a is additionally provided with gate switches 56a1 to 56a128, tunable filters 53aP (#1 to #16) in the protection system and gate switches 56aP (#1 to #16).

The description of the same components as those in the above-mentioned optical cross connect units (b) to (b4) will be omitted for simplicity.

Figure 9:
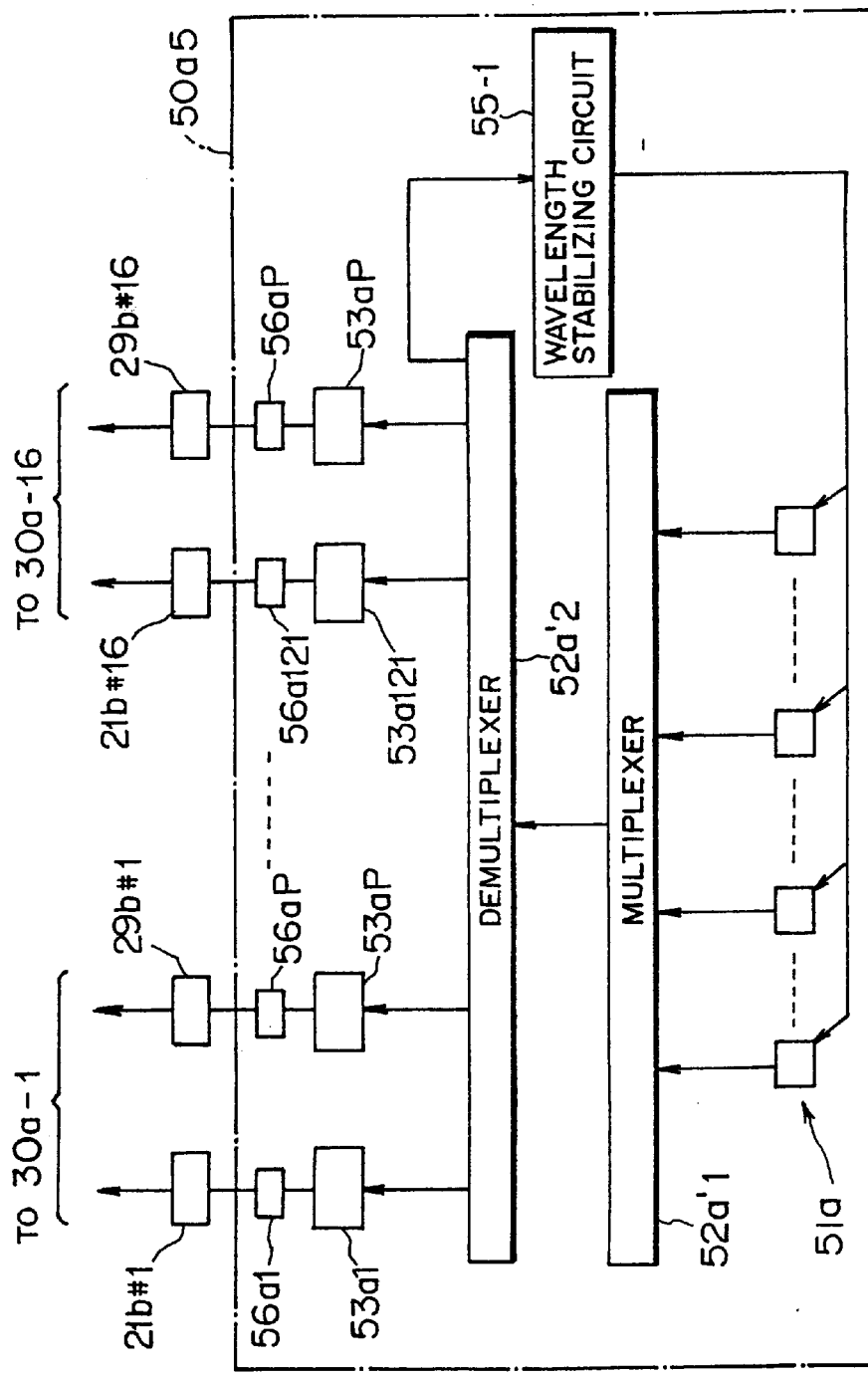
FIG. 9 is a block diagram showing a light source unit according to a fifth modification of the first embodiment of this invention.

FIG. 9 is a block diagram showing the light source unit 50a5 according to the fifth modification of the first embodiment of this invention.

Each of the gate switches 56a1 to 56a8 conducts a switching operation to determine whether or not to allow the light with a given wavelength passing through each of the tunable filters 53a1 to 53a8 coupled in series thereto to reach an 8×16 DC switch 30a-1. A 1×128 coupler 52a'2 is made to power-branch a multiplexed light into at least 16×8+16 (in the protection system).

The tunable filters 53aP (#1 to #16) in the protection system, when a portion of the OSs is out of order, allow the light with a wavelength included in the multiplexed light and used in newly producing an optical signal by the out-of-order OS to pass under the control of a wavelength setting control means 54a.

Incidentally, the electric signal which has been transmitted to the out-of-order OS is made the tunable filter 53aP (#1 to #16) in the protection system.

When an optical signal is newly produced in the spare OS 29b, the gate switch 56aP (#1 to #16) comes into the ON condition to transfer the light with a given wavelength from the tunable filter 53aP to the spare OS 29b.

With the above-described arrangement, in the optical cross connect unit 100a5 according to the fifth modification of the first embodiment of this invention, a portion of OSs is broken down, the electric signal which has been sent to the OS broken down is instead transmitted to the spare OS 29b.

Furthermore, the tunable filter 53aP in the protection system allows the light with a wavelength included in the multiplexed light and used in newly producing an optical signal by the out-of-order OS to pass under the control of a wavelength setting control means 54a.

For newly produce an optical signal in the spare OS 29b, the gate switch 56aP gets into the ON state to transfer the light with a given wavelength from the tunable filter 53aP in the protection system to the spare OS 29b.

The spare OS 29b receives an electric signal which has been forwarded to the out-of-order OS, and modulates the light with the given wavelength from the tunable filter 53aP in the protection system to transmit an newly produced optical signal to the 8×16 DC switch.

Now, let it be assumed that the OS 21b#1 belonging to #1 is broken down. The gate switch 56a1 comes into the OFF state so that the wavelength from the tunable filter 53a1 does not advance to the OS 21b#1, whereas the electric signal which has been transmitted from the OR 21a#1 to the OS 21b#1 is fed to the OS 29b#1, so that the tunable filter 53aP#1 in the protection system hands over the light with a wavelength originally passing through the tunable filter 53a1 to the gate switch 56aP#1 under the control of the wavelength setting control means 54a. The gate switch 56aP#1 delivers the light with the given wavelength from the tunable filter 53aP#1 in the protection system to the OS 29b#1, while the OS 29b#1 performs the modulation of the light with the given wavelength to newly produce an optical signal which in turn, is transmitted toward the 8×16 DC switch 30a-1.

To put it in another way, each of the spare OSs 29b (#1 to #16) receives light with a given wavelength from the tunable filter 53aP (# to #16) in the protection system through the gate switch 56aP (#1 to #16), and further serves as a spare optical reproduction relay section which is capable of accomplishing the same modulation as that of the optical reproduction relay system for the out-of-order OS.

Accordingly, since the optical cross connect unit 100a5 according to the fifth modification of the first embodiment of this invention employs 8 LD light sources, which respectively output optical wavelengths different from each other, with no use of 128 LDs, the unit arrangement becomes simplified and the manufacturing cost is reducible. In addition, as the number of distributions from the light source unit 50a5 increases, the cost per signal reduces proportionally.

Moreover, although the wavelength management is essential in the wavelength multiplexing transmission, since the 8 LDs can do for the light source unit 50a5, as compared with the preparation of 16×8 light sources, the number of light sources decreases, which can lessen the operations such as the wavelength management, the wavelength control and the wavelength monitoring, so that the management is expectable to be facilitated.

Figure 10:
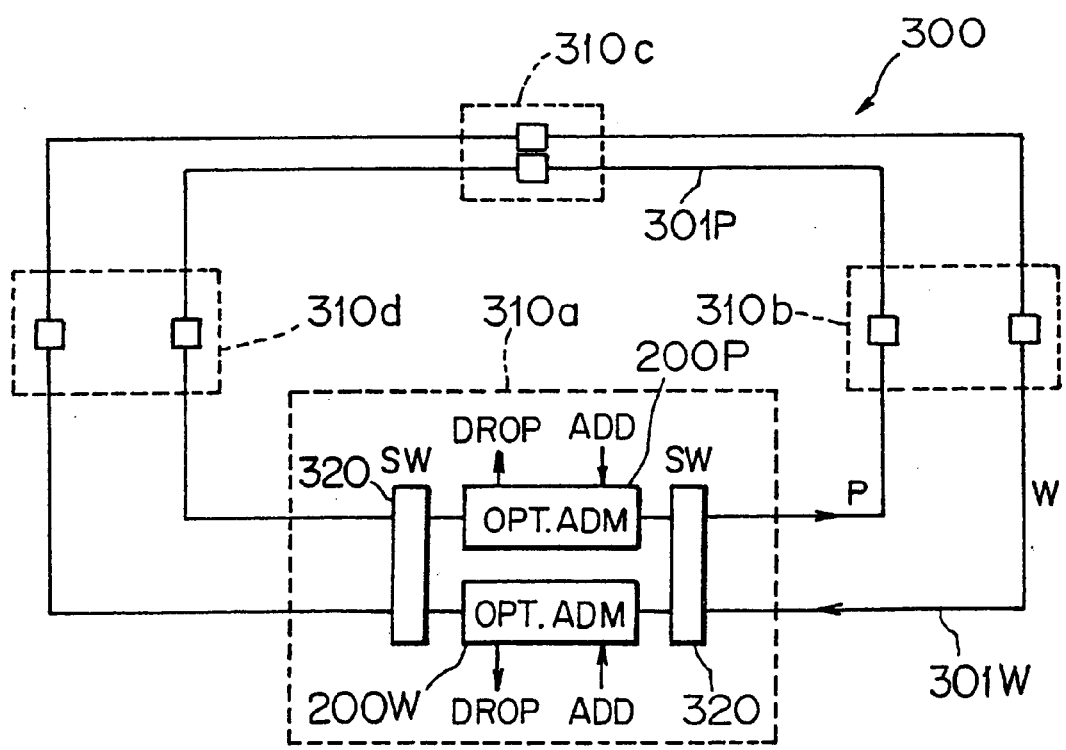
FIG. 10 is a block diagram showing a ring network to which an optical ADM unit according to a second embodiment of this invention is applicable.

Besides, through the equipment of the wavelength stabilizing circuit 55-1, it is possible to ensure the sufficient stability of the light source wavelengths, and because of the preparation of the spare light sources, it is possible to prevent the broken conditions of the light sources themselves. Further, owing to the equipment of the gate switches 56a1 to 56a128, the protection system tunable filters 53aP (#1 to #16) and the gate switches 56aP (#1 to #16), it is possible to maintain the system condition before the breakdown even if a portion of OSs or others is broken down. (c) Description of Second Embodiment FIG. 10 is a block diagram showing a ring network 300 to which an optical ADM unit 200 according to a second embodiment of this invention is applicable. As shown in FIG. 10, the ring network 300 is made up of optical fibers 301W/301P in the W system/P system for transmitting a wavelength multiplexed signal including 8 kinds of wavelengths different from each other, and nodes 310a to 310d serving as relay stations.

The description of the same components as those in the above-mentioned optical cross connect units (b) to (b5) will be omitted for simplicity.

Each of the nodes 310a to 310d is provided with optical ADM units 200W/200P in the W system/P system and switches 320 for conducting a switching operation between transmission paths for a wavelength multiplexed signal from the optical fiber 301W to the optical fiber 301P or vise versa.

The following description will be made of the case where each of the ADM units 200W/200P drops lights with 5 wavelengths from a wavelength multiplexed signal including 8 kinds of lights having wavelengths different from each other and adds optical signals with 5 (or below 5) wavelengths thereinto. In this case, the mention "optical signals with 5 (or below 5) wavelengths" is because, in the case of dropping P waves to N waves (N: natural number) which is the maximum using number, the number of wavelengths to be added does not always assume the P waves but P' waves below the P waves can be taken (P'=P can also occur).

Figure 11:
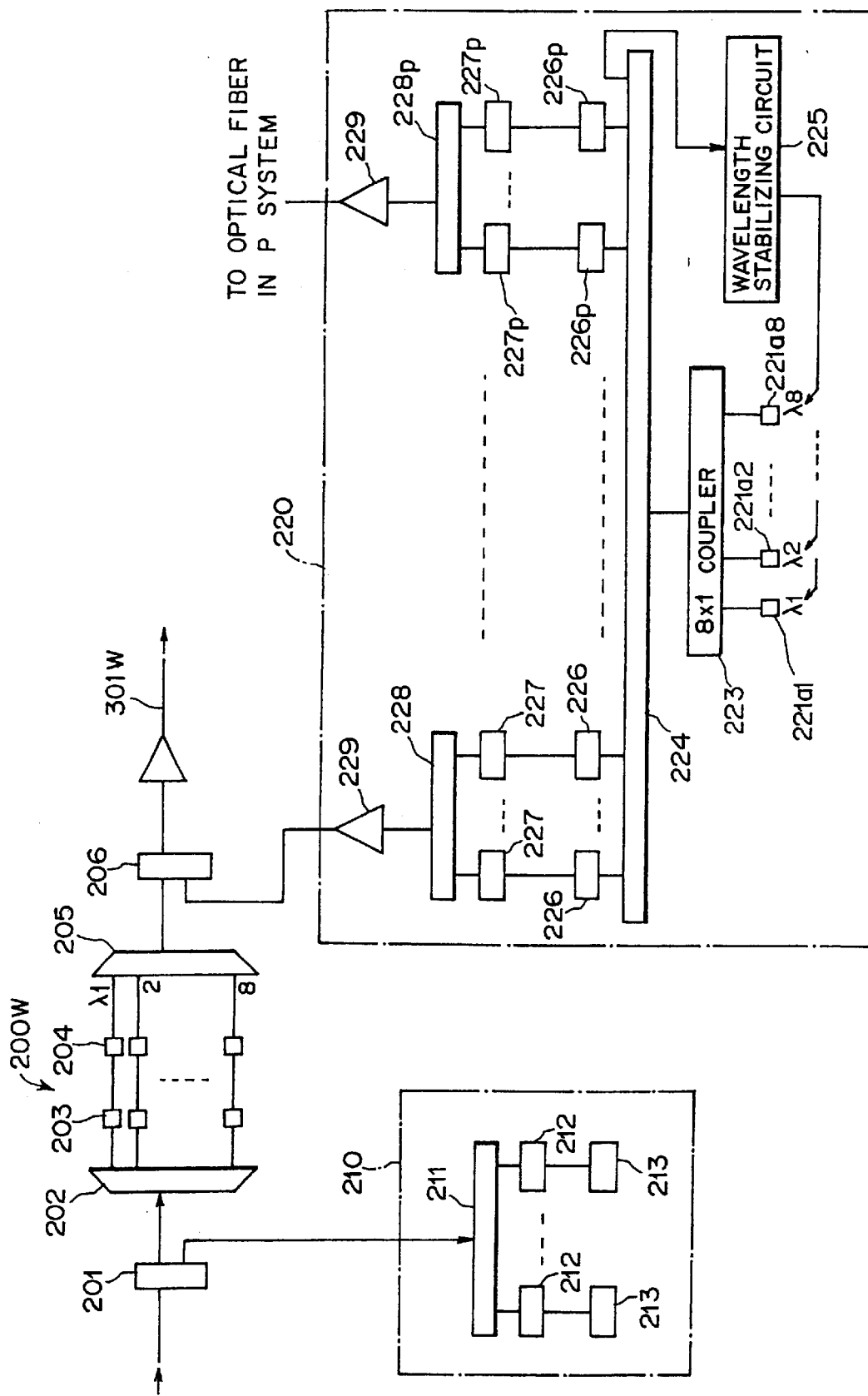
FIG. 11 is a block diagram showing an optical ADM unit according to the second embodiment of this invention.

FIG. 11 is a block diagram showing the optical ADM unit 200W according to the second embodiment of this invention. The optical ADM unit 200W shown in FIG. 11 is composed of a 2×1 coupler 201 for distributing one multiplexed light, a demultiplexer 202 for demultiplexing a wavelength multiplexed signal having 8 kinds of wavelengths different from each other in accordance with every wavelength, gate switches 203, attenuators 204, a multiplexer 205 for multiplexing wavelengths different from each other, a demultiplexing means 210, an inserting means 220, and a 2×1 coupler 206 for multiplexing the multiplexed light from the multiplexer 205 and the multiplexed light from the inserting means 220.

The dropping means 210 serves as a dropping section to drop arbitrary optical signals with 5 kinds of wavelengths of the 8 kinds of wavelengths constituting a multiplexed optical signal. As shown in FIG. 11, the dropping means 210 comprises a 1×5 coupler 211, tunable filters 212 and receivers 213.

The 1×5 coupler 211 power-branches the multiplexed light from the 2×1 coupler 201 into 5 multiplexed lights, and the tunable filters 212 permit arbitrary wavelength signals to pass under the control of the aforesaid wavelength setting control means 54a, and further the receivers 213 receive the optical signals from the tunable filters 212 after conducting the conversion into electric signals.

The adding means 220 functions as an adding section to add transmission optical signals having 5 kinds of wavelengths corresponding to the wavelengths dropped in the dropping means 210 into the transmission optical fiber 301W. The adding means 220 is composed of LD light sources 221a1 to 221a8 for outputting lights with 8 kinds of wavelengths different from each other, an 8×1 coupler 223, a demultiplexer 224 acting as a multiplexing and branching section for power-branching a multiplexed light into at least 5×2+1, a wavelength stabilizing circuit 225, tunable filters 226, modulators 227, a 5×1 coupler 228, and an amplifier 229.

The 8×1 coupler 223 is for multiplexing wavelengths from the LD light sources 221a1 to 221a8 to forward the multiplexing result to the demultiplexer 224. Because each of the optical ADM units 200W and 200P receives 5 kinds of lights having wavelengths different from each other through the demultiplexer 211, the demultiplexer 224 sends the multiplexed light to the 10 tunable filters 226, and further forwards a portion of the multiplexed light to the wavelength stabilizing circuit 225. Each of the tunable filters 226 allows the light with the wavelength the demultiplexer receives to pass under the control of a wavelength setting control circuit 226-1 (not shown in FIG. 11). Each of the modulators 227, serving as a modulating section, conducts the modulation of light with a given wavelength from the tunable filter 226 coupled in series thereto. The 5×1 coupler 228 multiplexes optical signals different from each other from the 5 modulators 227 to output the multiplexed optical signal through the amplifier 229 to the optical fiber 301. In a similar way, the optical signals from the other 5 modulators 227 are outputted through the 5×1 coupler 228 to the P system optical fiber 301. In the following description, the other 5 modulators 227, the tunable filters 226, the 5×1 coupler 228 and others belonging to the P system may be marked with p.

The wavelength setting control circuit 226-1 has the same arrangement as that of the above-mentioned wavelength setting control circuit 54a shown in FIG. 4, and serves as a wavelength setting control means.

The wavelength stabilizing circuit 225 also has the same arrangement as that of the above-mentioned wavelength stabilizing circuit 55 shown in FIG. 6, and acts as a wavelength stabilizing section to stabilize the wavelengths of the lights emitted from the LD light sources 221a1 to 221a8 on the basis of the multiplexed and branched lights outputted from the demodulator 224.

With the above-described arrangement, in the optical ADM unit 200W according to the second embodiment of this invention, the 5 tunable filters 212 respectively allow only given wavelengths of the multiplexed light fed through the demultiplexer 211 to pass.

On the other hand, in the adding means 220, for sending the lights with the wavelengths dropped in the dropping means toward the optical fiber 301, the tunable filters 226 permit the passage of the lights with the wavelengths dropped in the dropping means to send them to the modulators 227 under the control of the wavelength setting control means 226-1. The modulators 227 conduct the modulation of the lights with given wavelengths from the tunable filters 226, and the 5×1 coupler 228 multiplexes the optical signals from the 5 modulators 227 to send the multiplexed optical signals through the amplifier 229 and the 2×1 coupler 206 to the optical fiber 301.

In addition, the other 5 modulators 227p conduct the modulation of the lights with given wavelengths for transmitting them to the P system optical fiber 301p and output them to the 5×1 coupler 228. The 5×1 coupler 228p connected to the other 5 modulators 227p multiplexes 5 optical signals and outputs the multiplexed light to the P system optical fiber 301p.

Thus, the 5 lights from the tunable filters 227p other than a set of 5 tunable filters 227 in the adding means 220 are respectively used as optical signals from an adding means of the other optical ADM unit 200P connected through the switches 320 and others.

In this case, it is also possible that, without conducting the modulation in the modulators 227p (or with no use of the modulators 227p), the lights with the given wavelengths passing through the other 5 tunable filters 226p are outputted to the 5×1 coupler 228p and the 5×1 coupler 228p uses this multiplexed light as input light to be taken for when the other optical ADM units 200b to 200d coupled thereto through the optical fiber 301p conduct the data modulation processing.

Accordingly, in the optical ADM unit 200 according to the second embodiment of this invention, the wavelength multiplexed signal distributing light sources are employed and the wavelengths coming in the modulators 227, 227P can arbitrarily be selected through the tunable filters 226, 226p, and therefore, the LD light sources are reducible to 8 in number, which simplifies its construction, lowers its manufacturing cost and facilitates the management of the light sources. In addition, the equipment of the wavelength stabilizing circuit 225 can ensure the supply of the stable light outputs.

Besides, since the multiplexed and branched lights from the demultiplexer 224 can be supplied to the other optical ADM units 200b to 200d, it is possible to simplify the arrangement of the ring network 300.

(c1) Description of First Modification of Second Embodiment

An optical ADM unit 200W1 according to a first modification of the second embodiment of this invention differs from the above-described optical ADM unit 200W of (c) in comprising spare light sources 221a1' to 221a8', a switch 223-0, an optical switch 223-1, and a wavelength stabilizing circuit 225-1, but the other arrangement (see numerals 221a1 to 221a8, 223, 226, 227, 227p, 228, 228p, 229, 229p and others) is the same.

The description of the same components as those in the above-mentioned units (b) to (c) will be omitted for simplicity.

Figure 12:
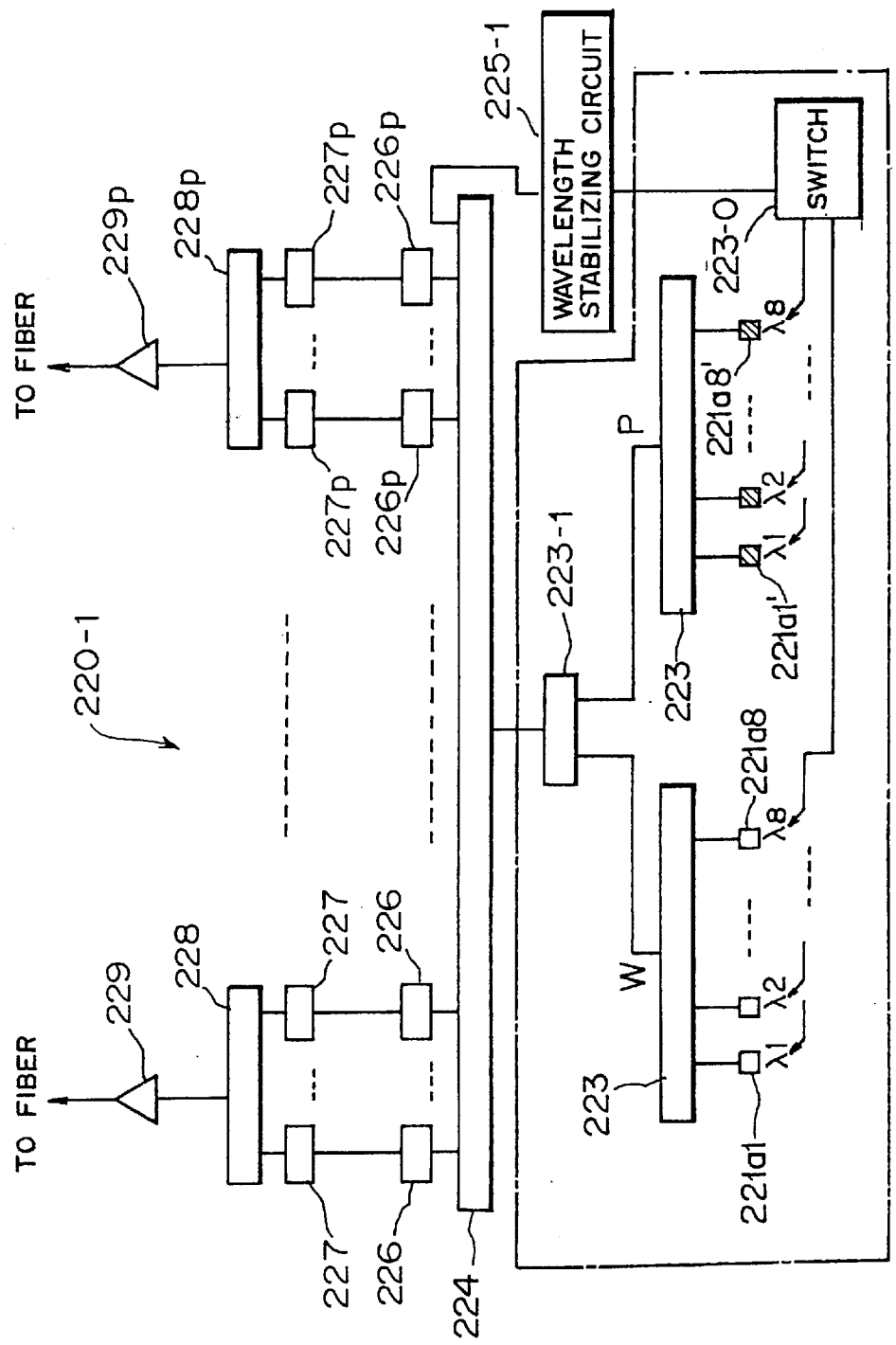
FIG. 12 is a block diagram showing an adding means according to a first modification of the second embodiment of this invention.

FIG. 12 is a block diagram showing an adding means 220-1 in the first modification of the second embodiment of this invention.

The wavelength stabilizing circuit 225-1 has the same arrangement as that of the above-mentioned wavelength stabilizing circuit 55-1 in the third modification of the first embodiment or that of the wavelength stabilizing circuit 225 in the second embodiment, and serves as a wavelength stabilizing means. A control circuit 55b detects the absence of light from LD light sources on the basis of the wavelength data on the LD light sources from a spectrum analyzer 55a, and further for, when detecting the absent wavelength in multiplexed light, making a decision that the LD for outputting the absent wavelength is out of order and switch the optical switch 223-1 from the W system to the P system.

The optical switch 223-1 has a switching function to choose one from the multiplexed light from the P system and the multiplexed light from the W system under the control of the control circuit 55b in outputting the multiplexed light to a demultiplexer 224.

The switch 223-0, under the control of the control circuit 55b, takes a switching action from LD light sources 221a1 to 221a8 in the work system to the LD light sources 221a1' to 221a8' in the protection system as operating LD light sources.

In case that any one of the LD light sources 221a1 to 221a8 in the work system is out of order, one of the LD light sources 222a1' to 222a8' in the protection system serves as a spare light source section which outputs light with the same wavelength as that of the out-of-order LD.

With the above-described arrangement, in the optical ADM unit 200W1 according to the first modification of the second embodiment of this invention, the spectrum analyzer 55a in the wavelength stabilizing circuit 225-1 monitors the multiplexed light outputted from the W system LD light sources 221a1 to 221a8 chosen by the optical switch 223-1 and outputs the monitor data to the control circuit 55b.

The control circuit 55b, when detecting the absence of the light with a given wavelength in the multiplexed light, makes a decision that the LD light source for emitting the light with the absent wavelength is broken down.

In addition, the control circuit 55b controls the optical switch 223-1 for switching from the W system to the P system. Further, the control circuit 55b controls the switch 223-0 so that the destination of a control signal is switched from the W system to the P system.

Under the control of the control circuit 55b, the switch 223-0 takes a switching operation so that the destination of the control signal is switched from the LD light sources 221a1 to 221a8 in the W system to the LD light sources 221a1' to 221a8' in the P system, while the optical switch 223-1 performs a switching operation of the multiplexed light to be outputted to a demultiplexer 224 from the W system to the P system. Drive circuits (not shown in FIG. 12) for driving the LD light sources 221a1' to 221a8' in the P system, in response to a switching signal for the switch 223-0, control the LD light sources 221a1' to 221a8' under the control of the wavelength stabilizing circuit 225-1 so that the LD light sources 221a' to 221a8' emit given wavelengths.

Accordingly, since the optical ADM unit 200W1 according to the first modification of the second embodiment of this invention employs the 8 LD light sources in the W (work) system and the 8 LD light sources in the P (protection) system, it is possible to simplify the unit arrangement and further to lower the manufacturing cost.

Moreover, although the wavelength management is essential in the wavelength multiplexing transmission, since the 8 LDs can do for light sources, the number of light sources is small, which can lessen the operations such as the wavelength management, the wavelength control and the wavelength monitoring, so that the management is expectable to be facilitated.

Besides, through the equipment of the wavelength stabilizing circuit 225-0, it is possible to ensure the sufficient stability of the light source wavelengths, and because of the preparation of the spare LD light sources 221a1' to 221a8', it is possible to prevent the broken conditions of the light sources themselves.

Incidentally, as in the case of the light source unit 50a4 according to the fourth modification of the first embodiment shown in FIG. 4, it is also appropriate to construct the optical ADM unit according to the first modification of the second embodiment. If the 8 LD light sources in the work (W) system and the 8 LD light sources in the protection (P) system are used as well as the optical ADM unit 200W1 according to the first modification of the second embodiment, the unit construction becomes simplified and the manufacturing cost is reducible. In addition, the number of light sources is small, which can lessen the operations such as the wavelength management, the wavelength control and the wavelength monitoring, so that the management is expectable to be facilitated.

(d) Description of Third Embodiment

Figure 13:
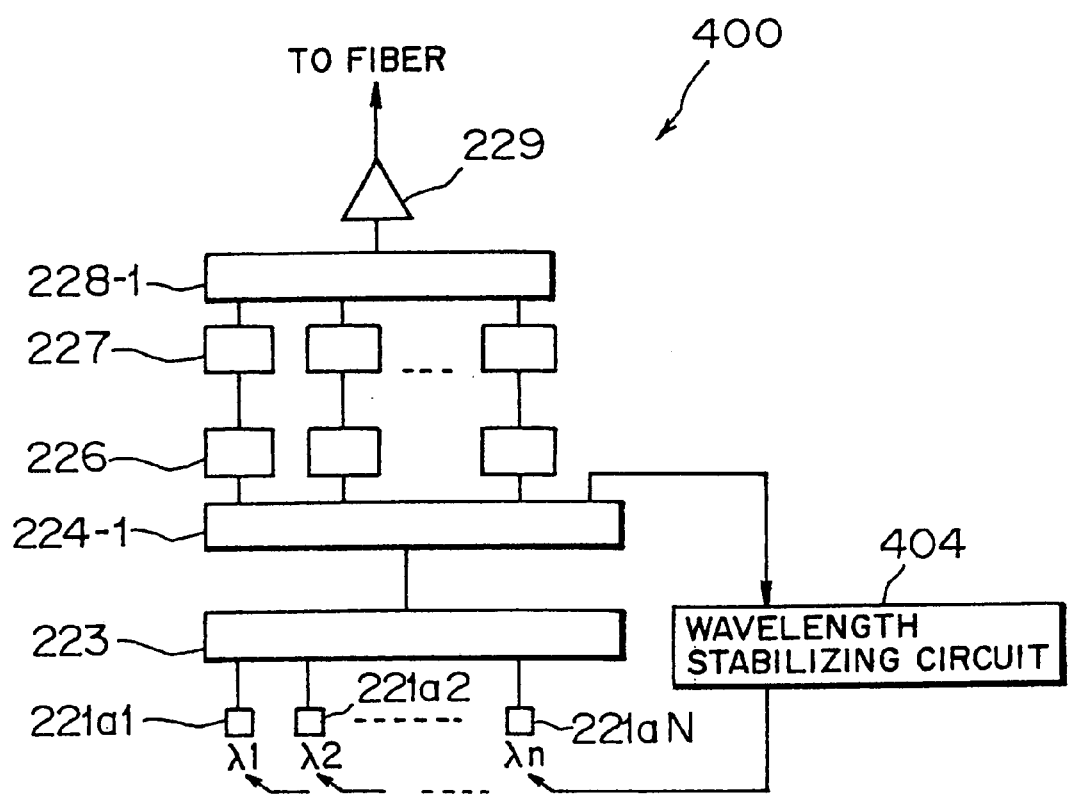
FIG. 13 is a block diagram showing a light source unit according to a third embodiment of this invention.
Figure 14:
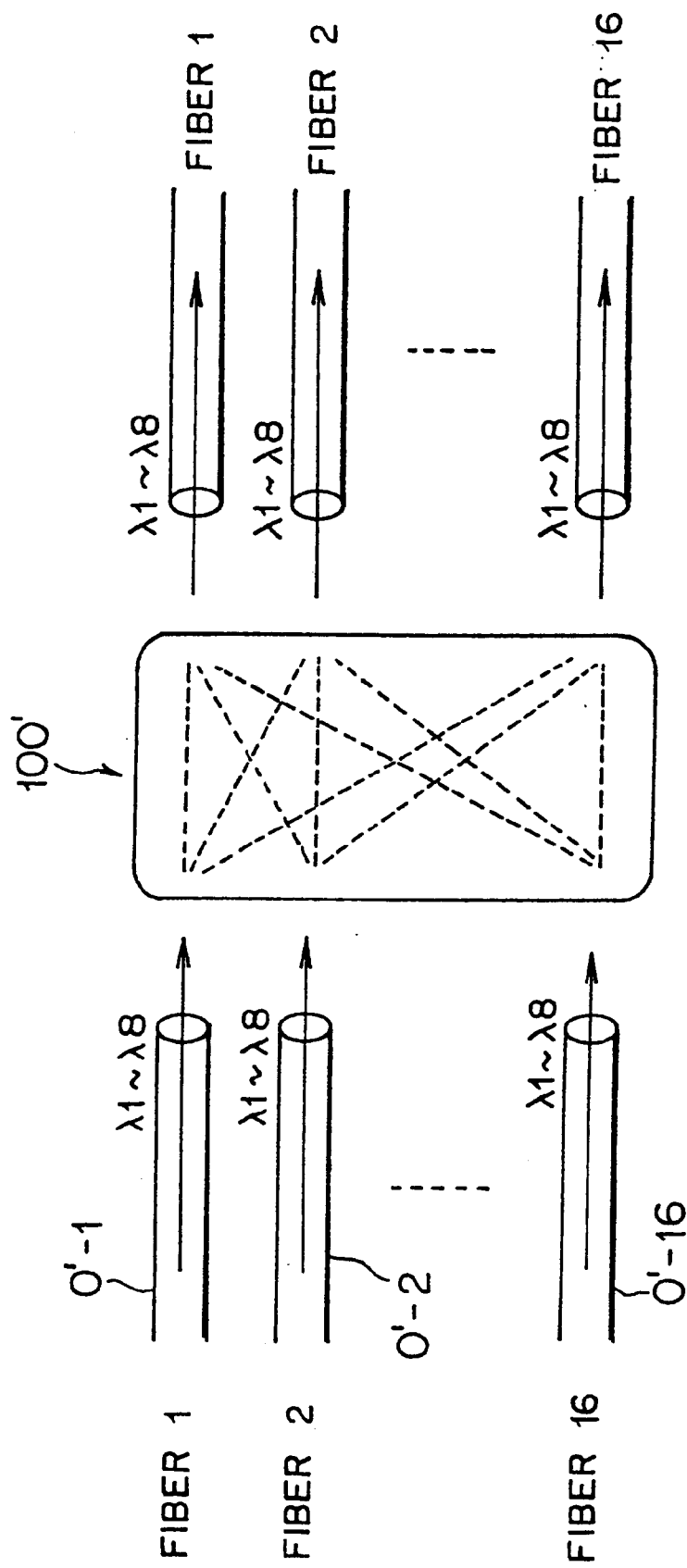
FIG. 14 is an illustration a related art.
Figure 15:
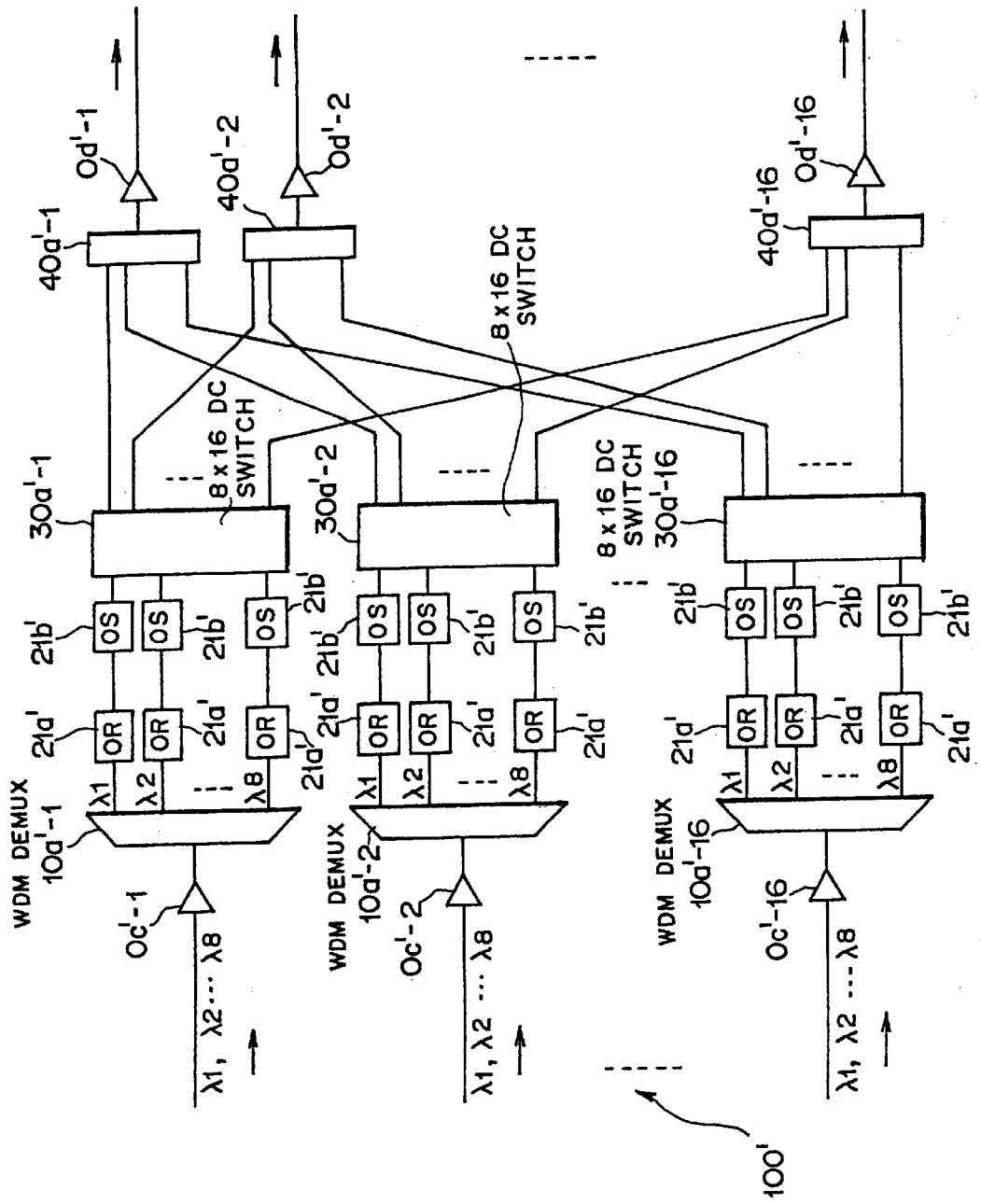
FIGS. 15 to 17 are block diagrams showing the related art.
Figure 16:
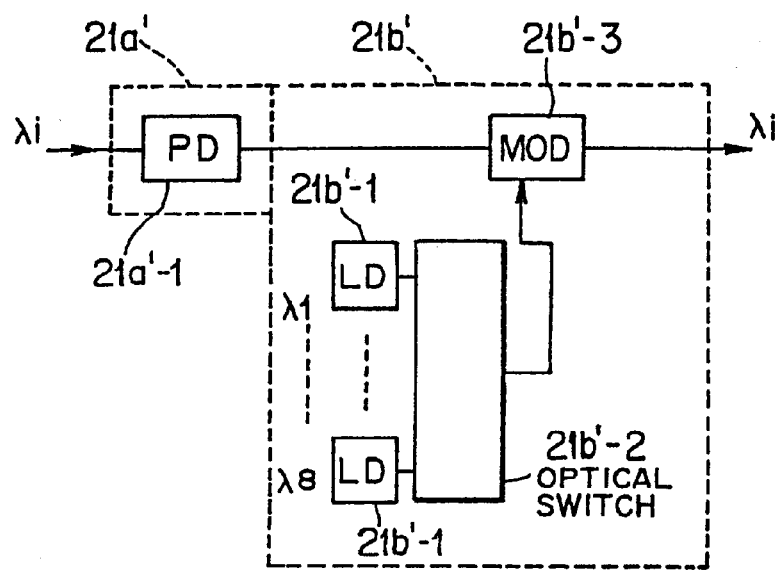
Figure 17:
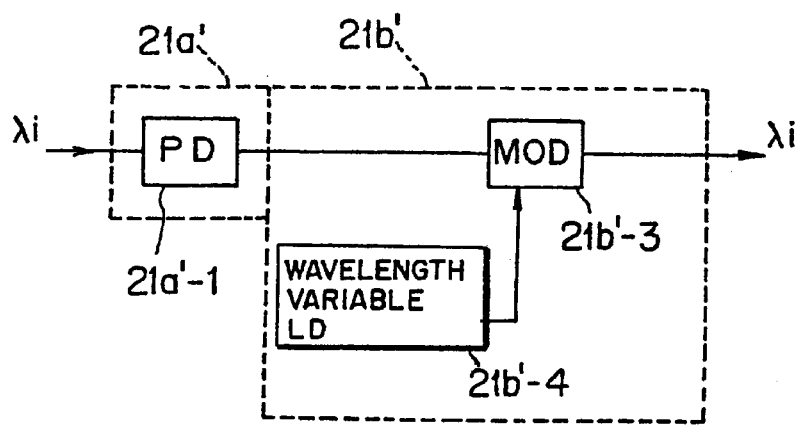
Figure 18:
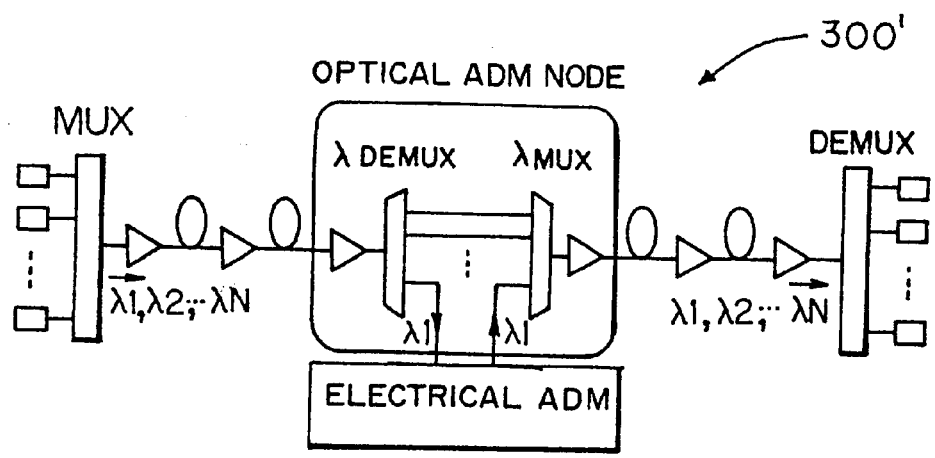
FIGS. 18 and 19 are illustrations of the related art.
Figure 19:
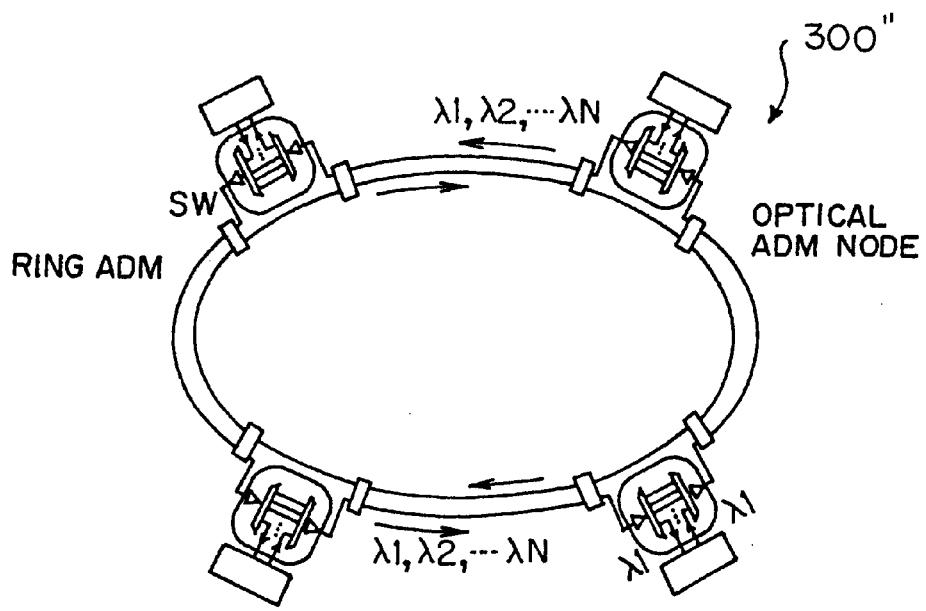
Figure 20:
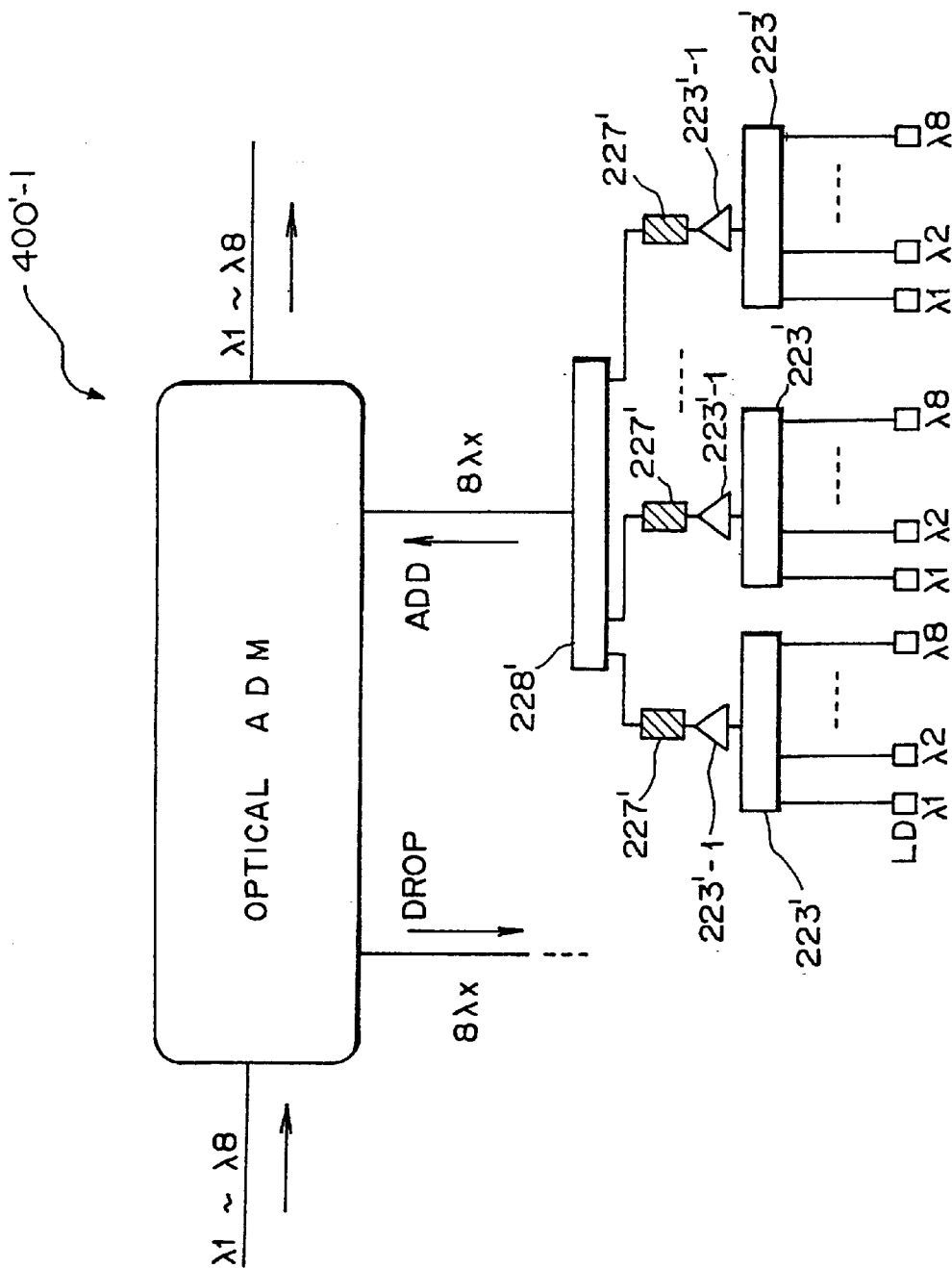
FIGS. 20 and 21 are block diagrams showing the related art.
Figure 21:
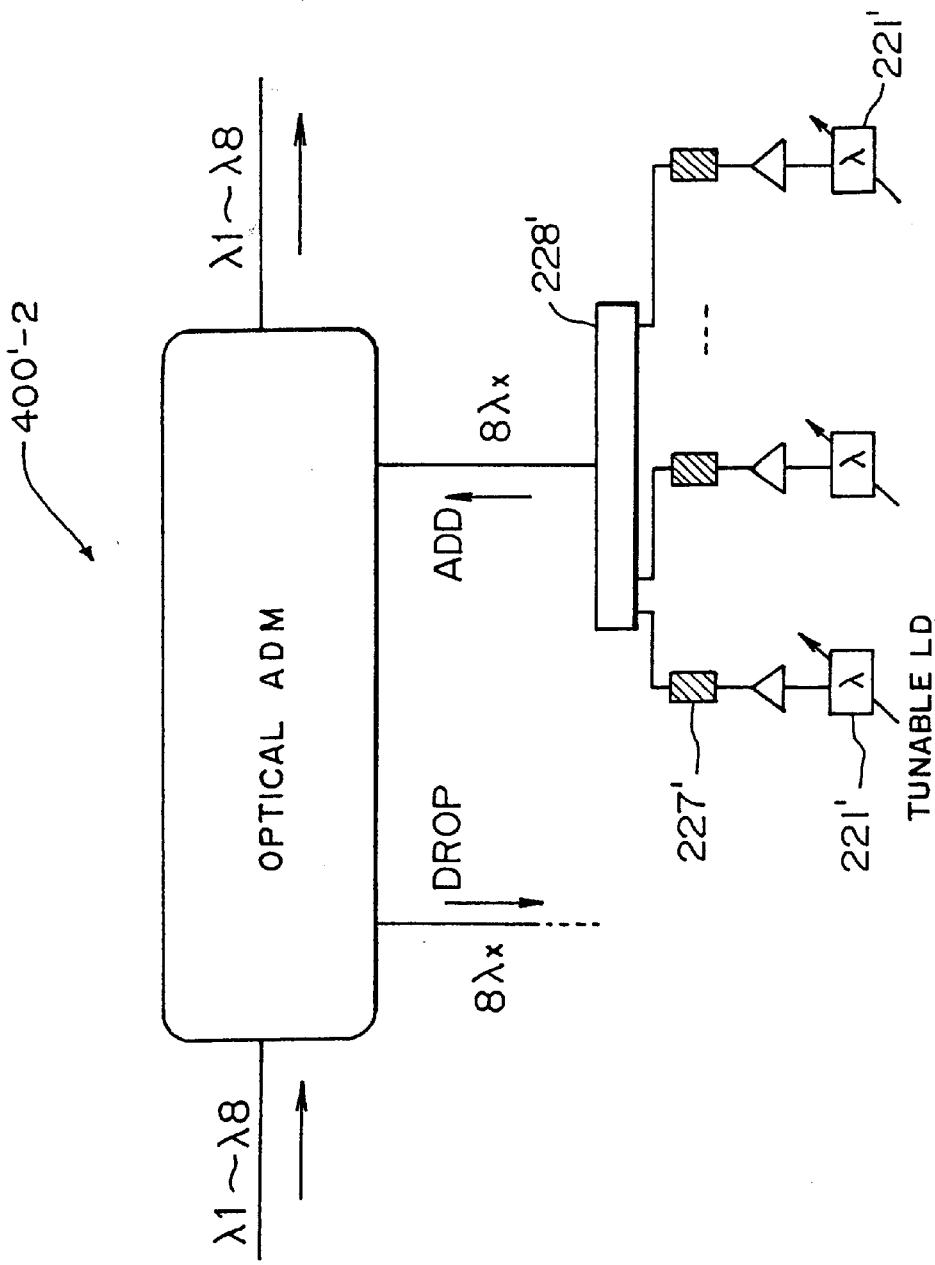

FIG. 13 is a block diagram showing a light source unit 400 according to a third embodiment of this invention. As shown in FIG. 13, the light source unit 400 is composed of N (N: natural number) LD light sources 221a1 to 221aN, a multiplexer 223, a demultiplexer 224-1 for demultiplexing a multiplexed light into N, tunable filters 226, modulators 227, an N×1 coupler 228-1 for multiplexing M optical signals, a wavelength stabilizing circuit 404, and an amplifier 229 for amplifying the output value of the multiplexed light.

The description of the same components as those in the above-mentioned units (b) to (c) will be omitted for simplicity.

The demultiplexer 224-1 is equivalent to the above-mentioned demultiplexer 224, while the N×1 coupler 228-1 corresponds to the above-mentioned 5×1 coupler 228 and the wavelength stabilizing circuit 404 is equivalent to the above-mentioned wavelength stabilizing circuit 55.

With this arrangement, in the light source unit 400 according to the third embodiment of this invention, each of the tunable filters 226 allows an arbitrary wavelength to pass under the control of a wavelength setting control means (not shown), while the N×1 coupler 228-1 multiplexes the M optical signals modulated in the modulators 227 and sends the multiplexed optical signal through the amplifier 229 to an optical fiber.

This, the light source unit 400 according to the third embodiment of this invention can select arbitrary lights through the use of the tunable filters 226 and can be used as a more suitable light source unit as compared with the arrangement of electrically switching (e) Others Although a detailed description has been made of the embodiments of this invention with reference to (b) to (d), the present invention is not limited to the embodiments, and that it is intended to cover all further chances and modifications of the embodiments of the invention herein used for the purpose of the disclosure, which do not constitute departures from the spirit and scope of the invention.

What is claimed is:

1. An optical cross connect unit comprising:

M wavelength separating sections for receiving multiplexed optical signals each having N kinds of wavelengths different from each other through M optical fibers, respectively, and for wavelength-separating each of said multiplexed optical signals into N optical signals;

M optical reproduction relay sections each for conducting an optical reproduction and relay in a manner of making a conversion of each of said N optical signals, wavelength-separated in each of said wavelength separating sections, into an electric signal and then modulating it with a desired optical wavelength;

a refill section for mutually refilling M sets of optical signals optically reproduced and relayed in said optical reproduction relay sections;

a focusing section for focusing said M sets of optical signals refilled in said refill section; and a light source unit for supplying input lights having desired wavelengths to be modulated in said M optical reproduction relay sections, said light source unit including:

N light sources for outputting lights having said N kinds of optical wavelengths;

a multiplexing and branching section for multiplexing said lights from said N light sources to produce a multiplexed light having N kinds of optical wavelength components and further for branching said multiplexed light into M×N lights to output them as multiplexed and distributed lights;

M wavelength filter sections for distributively receiving N multiplexed and distributed lights of said M×N multiplexed and distributed lights branched in said multiplexing and branching section to output N lights due to the passage of only arbitrary wavelengths of said N kinds of optical wavelengths; and a wavelength setting control section for setting optical wavelengths, which pass through said wavelength filter sections, so that they differ from each other, wherein said N lights from each of said M wavelength filter sections are supplied as said input lights.

2. An optical cross connect unit as defined in claim 1, wherein said multiplexing and branching section comprises a multiplexing coupler section for multiplexing said lights from said N light sources and a branching coupler section for branching said multiplexed light outputted from said multiplexing section into said M×N lights.

3. An optical cross connect unit as defined in claim 1, wherein said light source unit includes a spare light source section for, when any one of said N light sources is out of order, outputting light with a wavelength coinciding with the wavelength to be generated from said light source being out of order.

4. An optical cross connect unit as defined in claim 1, wherein each of said optical reproduction relay sections includes N photoelectric converting sections for converting N optical signals wavelength-separated in each of said wavelength separating sections into electric signals, respectively, and N modulating sections for modulating said input lights on the basis of said electric signals from said N photoelectric converting sections and for outputting the modulated input lights to said refill section.

5. An optical cross connect unit as defined in claim 4, wherein each of said optical reproduction relay sections is equipped with N gate switches for, when any one of said N modulating sections is out of order, placing an optical reproduction relay system based upon the corresponding modulating section into a cut condition, and a spare optical reproduction relay section for conducting the same modulation as that in said optical reproduction relay system based upon said out-of-order modulating section.

6. An optical cross connect unit as defined in claim 1, wherein said N light sources are constructed using one of a set of N semiconductor lasers and an array laser.

7. An optical cross connect unit as defined in claim 1, further comprising a wavelength stabilizing section for stabilizing a wavelength of light from each of said light sources on the basis of the multiplexed and distributed lights outputted from said multiplexing and branching section.

* * * * *